US012527819B2

(12) United States Patent
Novak et al.

(10) Patent No.: US 12,527,819 B2
(45) Date of Patent: Jan. 20, 2026

(54) METHOD OF PREVENTING OR TREATING VIRAL INFECTIONS

(71) Applicant: Vector Vitale IP LLC, North Miami Beach, FL (US)

(72) Inventors: Peter Novak, Sunny Isles Beach, FL (US); Maxim Temnikov, Miami, FL (US); Oleksandr Balakin, Dnepropetrovsk (UA)

(73) Assignee: Vector Vitale IP LLC, North Miami Beach, FL (US)

( * ) Notice: Subject to any disclaimer, the term of this patent is extended or adjusted under 35 U.S.C. 154(b) by 0 days.

(21) Appl. No.: 17/230,069

(22) Filed: Apr. 14, 2021

(65) Prior Publication Data

US 2021/0322467 A1    Oct. 21, 2021

Related U.S. Application Data

(60) Provisional application No. 63/009,714, filed on Apr. 14, 2020.

(51) Int. Cl.
| | | |
|---|---|---|
| *A61K 33/30* | (2006.01) | |
| *A61K 9/08* | (2006.01) | |
| *A61K 47/02* | (2006.01) | |
| *A61P 31/16* | (2006.01) | |
| *A61P 31/22* | (2006.01) | |

(52) U.S. Cl.
CPC ............. *A61K 33/30* (2013.01); *A61K 9/08* (2013.01); *A61K 47/02* (2013.01); *A61P 31/16* (2018.01); *A61P 31/22* (2018.01)

(58) Field of Classification Search
None
See application file for complete search history.

(56) References Cited

U.S. PATENT DOCUMENTS

| | | | |
|---|---|---|---|
| 9,861,659 B2 | 1/2018 | Novak et al. | |
| 10,183,041 B2 | 1/2019 | Novak et al. | |
| 10,226,484 B2 | 3/2019 | Novak et al. | |
| 10,799,530 B1 | 10/2020 | Novak et al. | |
| 10,933,091 B1 | 3/2021 | Novak et al. | |
| 2003/0099720 A1 | 5/2003 | Kelly | |
| 2005/0003020 A1* | 1/2005 | Smith | A61K 33/30 514/731 |
| 2018/0296596 A1 | 10/2018 | Novak et al. | |
| 2019/0022103 A1 | 1/2019 | Chevion et al. | |

FOREIGN PATENT DOCUMENTS

| | | |
|---|---|---|
| JP | 2006506400 A | 2/2006 |
| JP | 2007513959 A | 5/2007 |
| JP | 2018501312 A | 1/2018 |

OTHER PUBLICATIONS

Read et al. (Adv Nutr 2019;10:696-710).*
Balboni et al. (Journal of Trace Elements in Medicine and Biology 71 (2022)).*
McPherson et al. (Editorial in American Journal of Opthalmology (Aug. 2020).*
International Application No. PCT/US2021/027196, International Search Report and Written Opinion mailed Jul. 30, 2021, 17 pages.
Sergio et al., "Zinc salts that may be effective against the AIDS virus HIV," Medical Hypotheses, vol. 26, No. 4, 1988, pp. 251-253.
Sharma et al., "Trace Element Zinc, a Nature's Gift to Fight Unprecedented Global Pandemic COVID-19," Biological Trace Element Research, vol. 199, No. 9, 2020, pp. 3213-3221.
Rahman et al., "Can Zn Be a Critical Element in COVID-19 Treatment?," Biological Trace Element Research, vol. 199, No. 2, 2020, pp. 550-558.
Pal et al., "Zinc and COVID-19: Basis of Current Clinical Trials," Biological Trace Element Research, vol. 199, No. 8, 2020, pp. 2882-2892.
Joe Schwarcz, "Can zinc lozenges help with Coronavirus infections," McGill, Mar. 12, 2020.
Suara et al., "Effect of zinc salts on respiratory syncytial virus replication," Antimicrobial Agents and Chemotherapy, 2004, 48(3), 783-790.
Velthuis et al., "Zn2+ inhibits coronavirus and arterivirus RNA polymerase activity in vitro and zinc ionophores block the replication of these viruses in cell culture," PLOS Pathogens, 2010, 6(11), e1001176.
Darrell Hulisz, "Efficacy of zinc against common cold viruses: An overview," Journal of the American Pharmacists Association, 2004, 44, 594-603.
Canadian Application No. 3,175,593, Official Action mailed Jul. 29, 2024, 7 pages.
Japanese Application No. 2022-562841, Official Action mailed Apr. 12, 2024, 4 pages.

* cited by examiner

*Primary Examiner* — Anna R Falkowitz
*Assistant Examiner* — Garen Gotfredson
(74) *Attorney, Agent, or Firm* — Liang & Hennessey LLP; Stanley D. Liang

(57) ABSTRACT

A method of treating or preventing a disease or condition caused (at least in part) by, or related to, a viral infection in a patient, comprising administering to said patient a pharmaceutical composition comprising, in certain embodiments, $^{64}$Zn-enriched zinc, at a therapeutically effective or a prophylactically effective dose for treating or preventing the disease or condition caused by the viral infection.

4 Claims, 4 Drawing Sheets

METHOD OF PREVENTING OR TREATING VIRAL INFECTIONS

TECHNICAL FIELD

This disclosure relates to prevention or therapy for viral infections in a patient, including severe acute respiratory syndrome coronavirus 2 (SARS-CoV-2) infections.

BACKGROUND

Viral infections, such as infections by coronaviruses, have been problematic, both from the standpoint of therapy (or lack thereof) and dissemination of the infections and severity of the diseases caused by the infections in patients.

SUMMARY

In one aspect, this disclosure provides a method of treating or preventing a disease or condition caused (at least in part) by, or related to, a viral infection in a patient, comprising administering to said patient a pharmaceutical composition comprising zinc, at a therapeutically effective or a prophylactically effective dose for treating or preventing the disease or condition caused by the viral infection. In some embodiments, the composition comprises or is a composite of zinc and/or its isotopes with amino acids, which, in further embodiments, is dissolved either in culture medium (such as, for example, RPMI-1640) or in deuterium-depleted water. In some embodiments, the composition comprises $^{64}$Zn-enriched zinc (the term "$^{64}$Zn$_e$" is used herein to refer to $^{64}$Zn-enriched zinc). In some embodiments, the composition comprises or is a solution comprising natural Zn and/or Zn-64.

In some embodiments, the $^{64}$Zn-enriched zinc is in the form of a $^{64}$Zn$_e$ compound or a $^{64}$Zn$_e$ salt. In certain embodiments, the disclosed compositions contain zinc that is at least 80% $^{64}$Zn$_e$, at least 90% $^{64}$Zn$_e$, at least 95% $^{64}$Zn$_e$, or at least 99% $^{64}$Zn$_e$, for example, zinc that is 80% $^{64}$Zn$_e$, 85% $^{64}$Zn$_e$, 90% $^{64}$Zn$_e$, 95% $^{64}$Zn$_e$, 99% $^{64}$Zn$_e$, or 99.9% $^{64}$Zn$_e$.

The subject/patient may be a human or a non-human mammal, such as a non-human primate or a domesticated dog or cat.

Numerous other aspects are provided in accordance with these and other aspects of the invention. Other features and aspects of the present invention will become more fully apparent from the following detailed description and the appended claims.

DETAILED DESCRIPTION

Figure 1A:
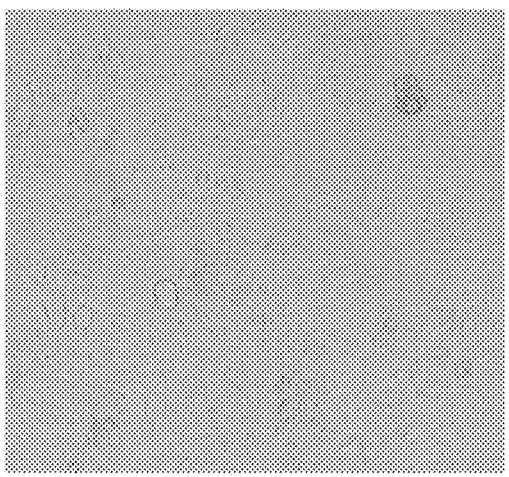
FIG. 1A and FIG. 1B show cytopathic effect of the influenza virus on MDCK cells manifested in cytodestruction of the cell monolayer. Magnification: 10×40

As used herein, the word "a" or "plurality" before a noun represents one or more of the particular noun.

For the terms "for example" and "such as," and grammatical equivalences thereof, the phrase "and without limitation" is understood to follow unless explicitly stated otherwise. As used herein, the term "about" is meant to account for variations due to experimental error. All measurements reported herein are understood to be modified by the term "about," whether or not the term is explicitly used, unless explicitly stated otherwise. As used herein, the singular forms "a," "an," and "the" include plural referents unless the context clearly dictates otherwise.

For the terms "for example" and "such as," and grammatical equivalences thereof, the phrase "and without limitation" is understood to follow unless explicitly stated otherwise. As used herein, the term "about" is meant to account for variations due to experimental error. All measurements reported herein are understood to be modified by the term "about," whether or not the term is explicitly used, unless explicitly stated otherwise. As used herein, the singular forms "a," "an," and "the" include plural referents unless the context clearly dictates otherwise.

All ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" or "5 to 10" or "5-10" should be considered to include the end points 5 and 10.

It is further to be understood that the feature or features of one embodiment may generally be applied to other embodiments, even though not specifically described or illustrated in such other embodiments, unless expressly prohibited by this disclosure or the nature of the relevant embodiments. Likewise, compositions and methods described herein can include any combination of features and/or steps described herein not inconsistent with the objectives of the present disclosure. Numerous modifications and/or adaptations of the compositions and methods described herein will be readily apparent to those skilled in the art without departing from the present subject matter.

"Effective amount," "prophylactically effective amount," or "therapeutically effective amount" refers to an amount of an agent or composition that provides a beneficial effect or favorable result to a subject, or alternatively, an amount of an agent or composition that exhibits the desired in vivo or in vitro activity. "Effective amount," "prophylactically effective amount," or "therapeutically effective amount" refers to an amount of an agent or composition that provides the desired biological, therapeutic, and/or prophylactic result. That result can be reduction, amelioration, palliation, lessening, delaying, and/or alleviation of one or more of the signs, symptoms, or causes of a disease, disorder or condition in a patient/subject, or any other desired alteration of a biological system. An effective amount can be administered in one or more administrations.

An "effective amount," "prophylactically effective amount," or "therapeutically effective amount" may be first estimated either in accordance with cell culture assays or using animal models, typically mice, rats, guinea pigs, rabbits, dogs or pigs. An animal model may be used to determine an appropriate concentration range and route of administration. Such information can then be used to determine appropriate doses and routes of administration for humans. When calculating a human equivalent dose, a conversion table such as that provided in *Guidance for Industry: Estimating the Maximum Safe Starting Dose in Initial Clinical Trials for Therapeutics in Adult Healthy Volunteers* (U.S. Department of Health and Human Services, Food and Drug Administration, Center for Drug Evaluation and Research (CDER), July 2005) may be used. The person of ordinary skill in the art is aware of additional guidance that may also be used to develop human therapeutic dosages based on non-human data. An effective dose is generally 0.01 mg/kg to 2000 mg/kg of an active agent, preferably 0.05 mg/kg to 500 mg/kg of an active agent. An exact effective dose will depend on the severity of the disease, patient's general state of health, age, body weight and sex, nutrition, time and frequency of administration, combination(s) of medicines, response sensitivity and tolerance/response to administration and other factors that will be taken into account by a person skilled in the art when determining the dosage and route of administration for a particular patient based on his/her knowledge of the art. Such dose may be determined by conducting routine experiments and at the physician's discretion. Effective doses will also vary depending on the possibility of their combined use with other therapeutic procedures, such as the use of other agents.

As used herein, a "patient" and a "subject" are interchangeable terms and may refer to a human patient/subject, a dog, a cat, a non-human primate, etc.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Viral Infections

A viral infection occurs when an animal's body is invaded by pathogenic viruses, and infectious virus particles (virions) attach to and enter susceptible cells. These infections cause various diseases/conditions. Some infections are quite contagious, such as influenza virus infection. Other infections are quite deadly, such as Ebola virus infection. New viral diseases occur with some frequency, usually when an animal viral pathogen infects humans. Examples include HIV, Ebola virus, etc. Unlike bacterial diseases, treatment of diseases due to viral infections is not so readily available.

In 2019-2021, a pandemic caused by a virus has raged in the human population. The disease is called COVID-19 and is caused by severe acute respiratory syndrome coronavirus 2 (SARS-CoV-2), previously referred to as the 2019 novel coronavirus (2019-nCoV). The virus is thought to have an animal origin and apparently was first transmitted to humans in Wuhan, China, in November or December 2019. The primary source of infection became human-to-human transmission shortly after. It is apparently primarily spread between people via respiratory droplets from coughs and sneezes.

Lungs are the organs most affected by COVID-19 because the virus accesses host cells via the enzyme ACE2, which is most abundant in the type II alveolar cells of the lungs. Zhang et al., *Intensive Care Med* (3 Mar. 2020) https://doi.Org/10.1007/s00134-020-05985-9. Angiotensin-converting enzyme 2 (ACE2), discovered as a homolog of ACE, acts as its physiological counterbalance, providing homeostatic regulation of circulating angiotensin II (Ang II) levels. ACE2 is a zinc metalloenzyme and carboxypeptidase located as an ectoenzyme on the surface of endothelial and other cells. The density of ACE2 in each tissue correlates with the severity of the disease in that tissue. As the alveolar disease progresses respiratory failure might develop and death might ensue. ACE2 may also be the path for the virus to assault the heart causing acute cardiac injury. Patients with existing cardiovascular conditions have worse prognosis than those without.

Zinc

Zinc is attributed to the trace elements which are essential for ensuring a proper metabolic status of the human body. More than 200 enzymes throughout the body depend on zinc. This element is either a constituent of enzymes or a regulator of their activity covering all classes of enzymes: transferases (RNA and DNA polymerases, reverse transcriptase, thymidine kinase, nucleotidyl transferase, carboxypeptidase and other peptidases), hydrolases (alkaline phosphatase, 5-nucleotidase, aminopeptidase, etc.), lyases (aldolase, carbonic anhydrase, etc.), oxidoreductases (alcohol dehydrogenase, superoxide dismutase, etc.), ligases and isomerases. Without zinc, no protein, fat or carbohydrates metabolism is possible.

Zinc has also been proven to exhibit a mediated antioxidant effect. Zinc is an inhibitor of NADPH oxidase, an enzyme complex that catalyzes the production of highly aggressive superoxide anion radicals. In addition, it can have a direct effect on the oxidation of free radicals at the stage of initiation of chain reactions; it is a structural component of some enzymes of the antioxidant defense system, including Cu/Zn-containing superoxide dismutase. By joining the thiol groups of proteins, zinc protects them from oxidation by reactive oxygen species. This trace element induces the synthesis of metallothioneins, cysteine-rich proteins acting as free radical scavengers. Zinc suppresses the formation of reactive mixed valence metal oxides and is involved in stabilization of the membrane structure.

The metabolic and structural significance of zinc is determined by a broad spectrum of its biological activity. Thus, zinc is necessary for the normal running of processes associated with cell division and differentiation (growth, tissue regeneration, spermatogenesis, and others), and is actively involved in metabolism of nucleic acids and protein synthesis. This trace element is important for metabolism of polyunsaturated fatty acids and reactions of prostaglandin transformations. It shows pronounced lipotropic activity and has hepatoprotective properties. Haase H., Rink L. Zinc Signaling. Zinc in Human Health/Amsterdam, Netherlands: IOS Press. 2011. 243.

In addition, zinc plays an extremely important role in immunological reactions as it is a regulator of the activity of phagocytes and lymphocytes and has an effect on chemotaxis of neutrophils. 5-nucleotidase, a zinc-containing enzyme, is of great importance in the functional state of T- and B-lymphocytes. Isolated zinc deficiency causes severe disturbances in various parameters of T-cell function, including thymus involution, inhibition of cell-mediated cytotoxicity and reduction in the total number of lymphocytes. Zinc is involved in metabolism and stimulation of the activity of pituitary hormones, adrenal glands, pancreas, prostate glands and testes. Zinc plays a clear role in the synthesis, storage and secretion of insulin. Haase H., Rink L. Zinc Signaling. Zinc in Human Health/Amsterdam, Netherlands: IOS Press. 2011. 243.

Zinc also acts as a synergist/antagonist to absorption of many trace elements and vitamins (iron, copper, magnesium, vitamins A, E, folic acid, and others) and has an effect on their metabolism.

In sum, zinc is involved in a variety of vital processes and functions in the human body. A detailed study of some of these functions is not yet fully completed, and many of the mechanisms of action of this trace element are still not fully understood or recognized. However, experimental and clinical studies presented in the literature show zinc as one of the key elements, the decrease in the levels of which in the body is associated with the onset and progression of a number of the most widespread non-epidemic diseases. Since the main metabolic processes in the body occur with the active participation of zinc-containing and zinc-dependent enzymes, its deficiency causes a violation of many vital processes.

The use of classical pharmacological forms of zinc—zinc salts and its chelates—does not always make it possible to achieve a proper effect of compensating for zinc deficiency due to the low bioavailability of this element.

Treatments Methods and Compositions

In one aspect, this disclosure provides a method of treating or preventing a disease or condition caused (at least in part) by, or related to, a viral infection in a patient, comprising administering to said patient a pharmaceutical composition comprising zinc, at a therapeutically effective or a prophylactically effective dose for treating or preventing the disease or condition caused by the viral infection. In some embodiments, the composition comprises or is a composite of zinc and/or its isotopes with amino acids, dissolved either in culture medium (such as, for example, RPMI-1640) or in deuterium-depleted water. In some embodiments, the composition comprises $^{64}$Zn-enriched zinc (the term "$^{64}$Zn$_e$" is used herein to refer to $^{64}$Zn-enriched zinc). In some embodiments, the composition comprises or is a solution comprising natural Zn and/or Zn-64. In some embodiments, the composition comprises $^{64}$Zn$_e$ in elemental form or in the form of a pharmaceutically acceptable salt, compound or complex thereof.

A subject may be in need of prophylaxis, for example and without limitation, if the subject is suspected to have contracted a viral infection, is in a high-risk group to contract a viral infection or is at a location with a high rate of a viral infection.

In some embodiments, the solution comprising natural Zn or Zn-64 is a citrate solution, a glutamic acid solution, a glycine-methionine solution, an EDDA solution, as sulfate solution, an aspartic acid solution, or a TBPDA solution.

In some embodiments, the $^{64}$Zn-enriched zinc is in the form of a $^{64}$Zn$_e$ compound or a $^{64}$Zn$_e$ salt. In certain embodiments, the disclosed compositions contain zinc that is at least 80% $^{64}$Zn$_e$, at least 90% $^{64}$Zn$_e$, at least 95% $^{64}$Zn$_e$, or at least 99% $^{64}$Zn$_e$, for example, zinc that is 80% $^{64}$Zn$_e$, 85% $^{64}$Zn$_e$, 90% $^{64}$Zn$_e$, 95% $^{64}$Zn$_e$, 99% $^{64}$Zn$_e$, or 99.9% $^{64}$Zn$_e$.

In some embodiments, the $^{64}$Zn$_e$ is in a form of salt selected from the group consisting of asparaginate, sulfate, and citrate. In further embodiments, the $^{64}$Zn$_e$ asparaginate has the chemical formula of $C_4H_5O_4N^{64}Zn_e$ with 2 aspartic acid molecules.

SARS-CoV-2 virus accesses host cells via the enzyme ACE2 with heavy isotopes of zinc. Thus, homeostatic correction of the activity of ACE2 should be used to treat a patient with COVID-19.

In some embodiments, the viral infection is an infection by SARS-CoV-2 and the patient is a human patient with an infection of SARS-CoV-2 or is in danger of being infected by SARS-CoV-2, such as, for example, been located in an area with a high rate of infection.

In some embodiments, the viral infection is an infection of an influenza virus, including the influenza A virus, herpes simplex virus, including herpes simplex virus type 2, hepatitis virus, including hepatitis C virus, Epstein Barr virus, a coronavirus, including SARS-CoV-2, Ebola virus, or HIV.

The term "$^{64}Zn_e$" is used herein to refer to $^{64}$Zn-enriched zinc. That is, zinc that is enriched for $^{64}$Zn such that $^{64}$Zn is enriched greater than its usual percentage in zinc in nature.

Zinc in the form of the light isotope $^{64}Zn_e$ is absorbed in the body much better than naturally occurring zinc. In certain embodiments, the disclosed compositions contain zinc that is at least 80% $^{64}Zn_e$, at least 90% $^{64}Zn_e$, at least 95% $^{64}Zn_e$, or at least 99% $^{64}Zn_e$, for example, zinc that is 80% $^{64}Zn_e$, 85% $^{64}Zn_e$, 90% $^{64}Zn_e$, 95% $^{64}Zn_e$, 99% $^{64}Zn_e$, or 99.9% $^{64}Zn_e$.

In some embodiments, the composition or solution further comprises a diluent or an excipient. In some embodiments, the diluent is water. In further embodiments, the water diluent is deuterium-depleted water.

In some embodiments, the $^{64}Zn_e$ compound or a salt thereof is between 20-100% $^{64}Zn_e$. In further embodiments, the $^{64}Zn_e$ compound or a salt thereof is at least 80% $^{64}Zn_e$. In further embodiments, the $^{64}Zn_e$ compound or a salt thereof is at least 95% $^{64}Zn_e$. In some embodiments, the composition contains between 0.05 mg and 110 mg of $^{64}Zn_e$. In some embodiments, the composition contains between 1 and 10 mg of $^{64}Zn_e$. In some embodiments, the $^{64}Zn_e$ compound or a salt thereof is at least 90% $^{64}Zn_e$ and the composition is an aqueous solution in which $^{64}Zn_e$ is present at a concentration of between 0.1 mg/ml and 10 mg/ml. In some embodiments, the $^{64}Zn_e$ is in a form of salt selected from the group consisting of asparaginate (chemical formula —$C_4H_5O_4N^{64}Zn_e$) with 2 aspartic acid molecules, sulfate, and citrate.

In some embodiments, the composition or solution is administered by injection. In other embodiments, the composition or solution is administered orally.

Formulating and Administering Compositions

The composition for use in the disclosed methods may be administered to a subject in need thereof by any suitable mode of administration, any suitable frequency, and at any suitable, effective dosage.

In some embodiments, the total amount of zinc administered is the same as the U.S. recommended daily allowance or intake of zinc. In some embodiments, the total amount of Zn administered is ½, twice, three times, five times, or ten times the U.S. recommended daily allowance or intake of zinc. In some embodiments, the total amount of Zn is between ½ and 10 times the U.S. recommended daily allowance or intake of zinc. A composition for use in a disclosed method may comprise the prescribed daily amount to be administered once a day or some fraction thereof to be administered a corresponding number of times per day. A composition for use in a disclosed method may also comprise an amount of Zn to be administered once every two days, once every three days, once a week, or at any other suitable frequency.

The composition for use in a disclosed method may be in any suitable form and may be formulated for any suitable means of delivery. In some embodiments, the composition for use in a disclosed method is provided in a form suitable for oral administration, such as a tablet, pill, lozenge, capsule, liquid suspension, liquid solution, or any other conventional oral dosage form. The oral dosage forms may provide immediate release, delayed release, sustained release, or enteric release, and, if appropriate, comprise one or more coating. In some embodiments, the disclosed composition is provided in a form suitable for injection, such as subcutaneous, intramuscular, intravenous, intraperitoneal, or any other route of injection. In some embodiments, compositions for injection are provided in sterile and/or non-pyrogenic form and may contain preservatives and/or other suitable excipients, such as sucrose, sodium phosphate dibasic heptahydrate or other suitable buffer, a pH-adjusting agent such as hydrochloric acid or sodium hydroxide, and polysorbate 80 or other suitable detergent.

When provided in solution form, in some embodiments, the composition for use in a disclosed method is provided in a glass or plastic bottle, vial or ampoule, any of which may be suitable for either single or multiple use. The bottle, vial or ampoule containing the disclosed composition may be provided in kit form together with one or more needles of suitable gauge and/or one or more syringes, all of which preferably are sterile. Thus, in certain embodiments, a kit is provided comprising a liquid solution as described above, which is packaged in a suitable glass or plastic bottle, vial or ampoule and may further comprising one or more needles and/or one or more syringes. The kit may further comprise instruction for use.

In certain embodiments, the dosage of Zn is proportional to various authoritative daily ingestion guidances (e.g., recommended dietary allowance (USRDA), adequate intake (AI), recommended dietary intake (RDI)) of the corresponding element.

In some embodiments, the composition for use in a disclosed method comprises or is a composite of zinc and/or its isotopes with amino acids, dissolved either in culture medium (RPMI-1640) or in deuterium-depleted water.

In some embodiments, the Zn dosage is between about ½ and about 20 times the guidance amount, more preferably between about 1 and about 10 times the guidance amount, even more preferably between about 1 and about 3 times the guidance amount. Thus, in certain embodiments, a single dose of a composition for use in a disclosed method for daily administration would be formulated to comprise a quantity within these ranges, such as about ½, about 1, about 3, about 5, about 10, and about 20 times the guidance amount. These amounts generally are for oral intake or topical application. In some embodiments, the intravenous dosage is lower, such as from about ¹⁄₁₀ to about ½ the guidance amount. Doses at the low end of these ranges are appropriate for anyone with a heightened sensitivity to a specific element or class of elements (e.g., those with kidney problems). For zinc, the daily guidance amount ranges from 2 mg in infants to 8-11 mg (depending on sex) for ages 9 and up. Daily dosages discussed throughout this application may be subdivided into fractional dosages and the fractional dosages administered the appropriate number of times per day to provide the total daily dosage amount (e.g. ½ the daily dose administered twice daily, ⅓ the daily dose administered three times daily, etc.). See Table 1.

TABLE 1

| Element/Isotope | guidance amount, daily | |
| --- | --- | --- |
| Zinc/$^{64}Zn_e$ | Birth to 6 months | 2 mg |
| | 7 months-3 years | 3 mg |
| | Children 4-8 years | 5 mg |
| | Children 9-13 years | 8 mg |
| | 14-18 years (boys) | 11 mg |

TABLE 1-continued

| Element/Isotope | guidance amount, daily | |
| --- | --- | --- |
| | 14-18 years (girls) | 9 mg |
| | Adults (men) | 11 mg |
| | Adults (women) | 8 mg |

The composition for use in a disclosed method can be produced by methods employed in accordance with general practice in the pharmaceutical industry, such as, for example, the methods illustrated in *Remington: The Science and Practice of Pharmacy* (Pharmaceutical Press; 21st revised ed. (2011) (hereinafter "*Remington*").

In some embodiments, the composition for use in a disclosed method comprise at least one pharmaceutically acceptable vehicle or excipient. These include, for example, diluents, carriers, excipients, fillers, disintegrants, solubilizing agents, dispersing agents, preservatives, wetting agents, preservatives, stabilizers, buffering agents (e.g., phosphate, citrate, acetate, tartrate), suspending agents, emulsifiers, and penetration enhancing agents such as DMSO, as appropriate. The composition can also comprise suitable auxiliary substances, for example, solubilizing agents, dispersing agents, suspending agents and emulsifiers.

In certain embodiments, the composition further comprises suitable diluents, glidants, lubricants, acidulants, stabilizers, fillers, binders, plasticizers or release aids and other pharmaceutically acceptable excipients.

A complete description of pharmaceutically acceptable excipients can be found, for example, in *Remington's Pharmaceutical Sciences* (Mack Pub., Co., N.J. 1991) or other standard pharmaceutical science texts, such as the *Handbook of Pharmaceutical Excipients* (Shesky et al. eds., 8th ed. 2017).

In some embodiments, the composition for use in a disclosed method can be administered intragastrically, orally, intravenously, intraperitoneally or intramuscularly, but other routes of administration are also possible.

Water may be used as a carrier and diluent in the composition. The use of other pharmaceutically acceptable solvents and diluents in addition to or instead of water is also acceptable. In certain embodiments, deuterium-depleted water is used as a diluent.

Large macromolecules that are slowly metabolized, such as proteins, polysaccharides, polylactic acids, polyglycolic acids, polymeric amino acids, copolymers of amino acids, can also be used as carrier compounds for the composition. Pharmaceutically acceptable carriers in therapeutic compositions may additionally contain liquids, such as water, saline, glycerol or ethanol. Moreover, the said compositions may further comprise excipients, such as wetting agents or emulsifiers, buffering substances, and the like. Such excipients include, among others, diluents and carriers conventional in the art, and/or substances that promote penetration of the active compound into the cell, for example, DMSO, as well as preservatives and stabilizers.

The composition for use in a disclosed method may be presented in various dosage forms depending on the object of application; in particular, it may be formulated as a solution for injections.

The composition for use in a disclosed method may be administered systemically. Suitable routes of administration include, for example, oral or parenteral administration, such as intravenous, intraperitoneal, intragastric as well as via drinking water. However, depending on a dosage form, the disclosed composition may be administered by other routes.

In certain embodiments, the composition for use in a disclosed method comprising Zn is administered intragastrically at a concentration of 2.25 mg/ml.

In some embodiments, the composition for use in a disclosed method is about 2 ml.

In some embodiments, the level of enrichment of $^{64}Zn_e$ is about 99% or more. In other further embodiments, the $^{64}Zn_e$ of the 2 ml composition comprises or consists of zinc asparaginate (chemical formula—$C_4H_5O_4N^{64}Zn_e$) with 2 aspartic acid molecules. The dose of the composition for use in a disclosed method may vary depending on the subject being treated, severity of the disease, the patient's condition and other factors that will be taken into account by a person skilled in the art when determining the dosage and route of administration for a particular patient based on his/her knowledge in the art.

Light isotopes may be purchased. Zn-64 oxide with the necessary degree of enrichment may be purchased from, for example, Oak Ridge National laboratory, Oak Ridge, TN, USA.

In some embodiments, zinc asparaginate has a chemical formula—$C_4H_5O_4N^{64}Zn_e$, with 2 aspartic acid molecules. The structure of this zinc asparaginate is:

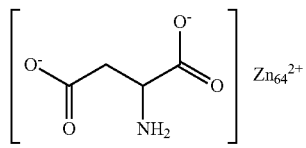

In certain embodiments, the composition for use in a disclosed method comprises $^{64}Zn_e$ at about 20% to about 100% of the composition.

The composition for use in the disclosed methods can be co-administered with another appropriate agent or therapy.

The viral infection may be any viral infection.

EXAMPLES

For this invention to be better understood, the following examples are set forth. These examples are for purposes of illustration only and are not be construed as limiting the scope of the invention in any manner.

Example 1. Anti-Viral Therapy Using Zinc-64 Isotopes Based Substances

Zinc is one of the most important micronutrients that plays an important role in metabolism and is a component of numerous metalloenzymes and transcription factors. Barbosa., M. S., et al. 1989 *J. Virol.* 63:1404-1407. It is well known that zinc is a part of 250-300 enzymes belonging to all six enzyme classes. Barthel, A., E A. Et al., 2007. *Arch. Biochen. Biophys.* 463:175-182. 10% of human proteins contain zinc. Beerheide, W. et al. 1999. *J. Natl. Cancer Inst.* 91:1211-1220. Bess, J. W. et al., 1992. *J. Virol.* 66:840-847. Zinc is crucial for normal functioning of the immune system as it increases the number thymocytes and peripheral T cells Boyle, W. J. et al., *Cell* 64:573-584.

Zinc is necessary for the growth and development of bone tissue. Briggs, M. W. et al. 2001. *Virology* 280:169-175. Zn-containing enzymes, which are involved in the synthesis and/or decomposition of carbohydrates, lipids, proteins and nucleic acids, cover all known classes of enzymes. Brottier, P. et al. 1992. *J. Gen. Virol.* 73:1931-1938. Zinc is a structural component of the superoxide dismutase (SOD), an enzyme which is an important part of an antioxidant defense system. Culp, J. S. et al., 1988. *Proc. Natl. Acad. Sci. USA* 85:6450-6454; De Oliveira, W. R. et al., 2003. *J. Eur. Acad. Dermatol. Venereol.* 17:394-398.

Participation of $Zn^{-2}$ ions in the structure of zinc fingers—proteins which bind DNA—provides this metal a special place in cell biology. Zinc has long been known as a microelement involved in the most important processes including the synthesis and functioning of numerous proteins in the cell, signal transduction, proteins and transcription factors.

Uncovering these molecular details of zinc homeostasis in the cell has unexpectedly opened new avenues in the field of virology, shedding new light on host-virus interactions. It has long been recognized that $Zn^{+2}$ is an important cofactor not only of cellular proteins but of many viral proteins as well. Recent studies demonstrated that the cellular environment itself, with its extremely small and tightly controlled pool of free zinc, may represent a limiting factor. Viruses rely on the intracellular store of zinc ions and use cellular $Zn^{+2}$ for their newly synthesized proteins. Consequently, the cellular systems controlling zinc balance might constitute a natural protective barrier that limits the accessibility of zinc and thus interferes with virus replication.

In this regard, the purpose of this work was to conduct a study into the effect of composites of natural zinc and its isotopes (light Zn-64) on the reproduction of RNA and DNA viruses.

The purpose of this work is to study the cytotoxicity and antiviral activity of zinc isotopes (Zn-64) against the models of herpes simplex virus, Epstein-Barr virus, influenza virus and the surrogate model of hepatitis C virus (bovine viral diarrhea virus) in vitro and in vivo.

Materials and Methods

Investigated Substances

Zinc and its light isotopes in various solvents such as citrate (citric acid), sulfate, aspartic and glutamic acids, glycine-methionine, TBPDA (n-n-toluenesulfonyl-n-benzoyl-o-phenylenediamine) and EDDA (ethylenediaminedisuccinic acid) were used in the studies.

4 Zn-64 in citrate solution (0.9 mg/ml)
4 k Natural Zn in citrate solution (0.9 mg/ml)
5 Zn-64 in EDDA (3 mg/ml)
5 k Natural Zn in EDDA (3 mg/ml)
6 Zn-64 in sulfate solution (3 mg/ml)
6 k Natural Zn in sulfate solution (3 mg/ml)
7 Zn-64 in aspartic acid solution (1.5 mg/ml)
7 k Natural Zn in aspartic acid solution (1.5 mg/ml)
8 Zn—64 in glutamic acid solution (1.5 mg/ml)
8 k Natural Zn in glutamic acid solution (1.5 mg/ml)
9-1 Zn-64 in glycine-methionine solution (2 mg/ml)
9-2 Natural Zn in glycine-methionine solution (1.5 mg/ml)
9-3 Glycine-methionine solution
10-1 Zn 64 in TBPDA solution (3 mg/ml)
10-2 Natural Zn in TBPDA solution (0.9 mg/ml)
10-3 TBPDA solution (0.9 mg/ml)
11 Zn 64 TBPDA solution—14 days
9a Solution for composite 7—aspartic acid—3.41 mg/ml
10a Solution for composite 8—glutamic acid—4 mg/ml
8a Solution for composite 4—citric acid—2.3 mg/ml Reference Drugs Acyclovir (lyophilized preparation containing 250 mg of sodium salt as active ingredient) manufactured by KRKA, Slovenia from the active substance by The Welcome Foundation Limited; Tamiflu manufactured by F. Hoffmann-La Roche Ltd, Switzerland.

Cell Cultures

Cell cultures were obtained from the Museum of Tissue Cultures of D.I. Ivanovsky Institute of Virology (RAMS, Moscow):

MDCK, a transplantable canine kidney cell culture
VNK, transplantable cells of hamster embryo kidney epithelium
MDBK, a transplantable culture of bovine kidney cells
B 95-8 (marmoset leukocytes), which are transformed by the Epstein-Barr virus (EBV) and chronically produce it, served as a source of EBV
Raji, undifferentiated human B lymphoblastoid cells from Burkitt's lymphoma The cell cultures were grown in a growth medium that consisted of 90% RPMI 1640 medium (Sigma, USA), 10% fetal bovine serum (Sigma, USA) and penicillin antibiotics (100 g/ml), streptomycin (100 μg/ml) and L-glutamine (2 mM). 0.25% Versene solution (Sigma, USA) was used to disaggregate the monolayer of epithelial cells.

The cells were grown in plastic tissue culture flasks, in 24 and 96 well plates, in a thermostat at 37° C. and 5% $CO_2$. The proliferative activity of the cells was checked every two days using a light inverted microscope.

Viruses

Influenza virus: a strain of the influenza virus, A/FM/1/47 (H1N1), with the infectious titer of 5.0-9.0 lg $EID_{50}$/0.2 ml in allantoic culture and hemagglutinin titer of 1:512 GAO/0.2 ml, was obtained from the Museum of Viruses of D.I. Ivanovsky Institute of Virology (RAMS, Moscow) to be used in the study.

Herpes simplex virus type 2 (HSV-2): strain BH was obtained from the Museum of Viruses of D.I. Ivanovsky Institute of Virology (RAMS, Moscow). The virus was maintained through consecutive passages in the culture of BNK cells. The infectious titer for CPE in the cell culture was 6.0-9.0 lg $TCD_{50}$/0.1 ml.

Bovine viral diarrhea virus (BVDV): viral material on the 4th passage was provided by A. Deryabin, a researcher at the Institute of Veterinary Medicine, UAAS. The infectious virus titer after ten passages in MDBK cell culture was 5-9 lg $ID_{50}$.

The Epstein-Barr virus (EBV) was recovered from the lymphoblastoid culture of B95-8 cells (B lymphocytes in the marmoset), commonly used as a source of EBV, using the method of Walt, Crawford. Finkel A., Czajke D. The effect of deuterium oxide on ascites tumor growth in mice/Ed. F. N. Furness, New York: New York Acad. Sci, 1960. P. 755-762.

Determination of Cytotoxic Concentration ($CC_{50}$) of the Drugs

Different cell cultures were used to determine the $CC_{50}$ of each drug. At least ten rows of wells in the cell culture plates were used for each dilution of the drug in a nutrient medium. The plates containing the cell culture were incubated at 37° C. and 5% $CO_2$ in air for 5 days. Observations of the test and control cultures were carried out every day to determine the presence or absence of cytopathogenic effect (CPE).

The CPE degree was determined by changes in cell morphology (rounding, shrinkage of cells of cells, rejection of cells that suffered degenerative changes from the well surface) using a 4 plus system from + to ++++:

"−"—complete absence of cell degeneration
"+"—no more than 25% of the cell monolayer is affected (75% protection of cell monolayer from an antiviral drug)
"++"—no more than 50% of the cell monolayer is affected
"+++"—no more than 75% of the cell monolayer is affected
"++++"—complete degeneration of the cell monolayer The $CC_{50}$ of the drug was its maximum concentration that did not cause cell degeneration.

A colorimetric assay using MTT 3-(4,5-dimethylthiazol-2-yl)-2,5-diphenyltetrazolium bromide (Sigma, USA) is based on the features of functioning of the dehydrogenase system of mitochondria of living cells which, under normal conditions, reprocess the artificial substrate MTT into a formazan that can be accounted spectrophotometrically. Transformation of MTT into formazan significantly decreases in dose-dependent manner when cells die under the action of a virus or substances toxic for cells.

The MTT substrate (Sigma, USA) was dissolved in sterile phosphate buffered saline (pH 7.2) at room temperature to a concentration of 5 mg/ml. The filtered MTT solution in a volume of 20 μl was added to the wells of a 96-well plate and incubated with the cells for 2 to 4 hours at 37° C. After incubation, the medium was removed, and 150 μl of 96° ethanol was added to the cells to dissolve the formazan crystals. The optical density of the solutions was determined spectrophotometrically using a Multican FC reader ("Thermo Scientific" (USA)) at a wavelength of 540 nm. The drug concentration inhibiting cell viability by 50% ($CC_{50}$) compared with the control was calculated using the linear regression program in Microsoft Excel created for Pentium Pro.

Determination of the Effective Concentration ($EC_{50}$)

The $EC_{50}$ is the minimum concentration of the drug that inhibits the development of virus-specific CPE by 50%. To determine the $EC_{50}$, the cell culture was infected with the test virus at a dose of 100 $TCD_{50}$/0.1 ml and then incubated at 37° C. for 60 minutes (min). After adsorption, unbound viruses were removed, the cells were washed with the nutrient medium and the drugs at different concentrations were added to the cell maintaining medium (RPMI-1640+2% fetal serum). The lack of CPE in the experiment (in the treated cultures), while it was present in the control, as well as the reduction of the infectious titer in the treated cultures, with the presence of the same in the control and the difference in the infectious titers in the experiment compared with the control of the virus, made it possible to determine the $EC_{50}$ of the drug.

Determination of Selectivity Index (IS) of the Drug

The selectivity indices (IS) of the drugs were determined as the ratio of $CC_{50}$ to $EC_{50}$.

Cytological Analysis

Cytological analysis was performed after fixing the cells grown on cover-glasses in Shabadash's fluid (9 parts of copper nitrate in ethyl alcohol+1 part of formalin) for 30 minutes. The samples for the cytological analysis were stained using hematoxylin and eosin stain according to the generally accepted procedure.

The mitotic index was calculated by analyzing 3000-10000 observed cells and was expressed in ppm (‰), which was the number of mitoses per 1000 cells. At the same time, the presence of pathological forms of mitosis was determined. A classification developed by V. N. Blyumkin was used for the analysis of pathological mitoses.

The examination of cytological preparations was carried out with lenses ×40 and ×100, eyepiece ×10 in a Standard 20, Zeiss microscope.

In Vitro Amplification Using Polymerase Chain Reaction (PCR)

PCR was performed according to a standard procedure using a set of reagents for PCR (AmpliSens, Russia) and DNA recombinant plasmid based on the pUC vector 28 containing the coding sequence of the human leukemia inhibitory factor (LIF) gene as a template. The DNA concentration was 1-25 µg/100 µl of the reaction mixture. Amplification of DNA was carried out in a thermostat for PCR analysis ("Terzik", DNA Technology, Moscow). The investigated substances were tested at concentrations of 5-40 µg/ml.

DNA viruses were isolated from the samples using the innuPREP Virus DNA Kit (Analityk Jena AC, Germany) or DNA-sorb-B DNA kit (AmpliSens, Russia) according to the manufacturer's instructions. DNA concentration was measured using the Eppendorf BioPhotometer (Germany). The Epstein-Barr virus DNA was analyzed using the AmpliSens® EBV-FL kit (FSIS CSRI, Russia) according to the manufacturer's instructions with real-time detection (qTOWER 2.2 amplifier, Germany).

Results

Determination of Cytotoxic Concentration ($CC_{50}$) of the Drugs Under Study

MDCK, VNK and MDBK cells were used to determine the $CC_{50}$ of each drug. At least ten rows of wells in the cell culture plates were used for each dilution of the drug in a nutrient medium. The plates containing the cell culture were incubated at 37° C. and 5% $CO_2$ in air for 5 days. Observations of the test and control cultures were carried out every day to determine the presence or absence of cytopathogenic effect (CPE). The CPE degree was determined by changes in cell morphology (rounding, shrinkage of cells, rejection of cells that suffered degenerative changes from the well surface) using a 4 plus system from + to ++++.

The $CC_{50}$ of the drug was its maximum concentration that did not cause cell degeneration. The results are shown in Table 2.

TABLE 2

$CC_{50}$ values of the drugs under study in the cell cultures permissible for the influenza virus (MDCK), herpes simplex virus (VNK) and Bovine viral diarrhea virus (model of hepatitis virus) (MDBK)

| | $CC_{50}$(µg/ml) | | | |
|---|---|---|---|---|
| | Raji | MDCK | VNK | MDBK |
| 4 Zn-64 in citrate solution | 39 | 45 | 3 | 5 |
| 4 Natural Zn in citrate solution | 460 | 180 | 180 | 180 |
| 5 Zn-64 in EDDA | 4.4 | 75 | 9 | 9 |
| 5 Natural Zn in EDDA | 904 | 600 | 600 | 600 |
| 6 Zn-64 in sulfate solution | 0.12 | 75 | 9 | 9 |
| 6 Natural Zn in sulfate solution | 1064 | 600 | 600 | 600 |
| 7 Zn-64 in aspartic acid solution | 84 | 75 | 9 | 5 |
| 7 Natural Zn in aspartic acid solution | 305 | 5 | 5 | 5 |
| 8 Zn-64 in glutamic acid solution | 470 | 300 | 300 | 300 |
| 8 Natural Zn in glutamic acid solution | 499 | 5 | 5 | 5 |
| 9 Zn-64 in glycine-methionine solution | 200 | 200 | 200 | 200 |
| 9 Natural Zn in glycine-methionine solution | 79 | 150 | 5 | 2 |
| 10 Zn 64 in TBPDA solution | 182 | 2 | 2 | 2 |
| 10 Natural Zn in TBPDA solution | 35 | 23 | 6 | 1 |

Analysis of the toxicity of substances in the culture of Raji lymphoblastoid cells shows that the least toxic substances are the glutamate and glycine-methionine-based drugs, with $CC_{50}$ values of 470 and >200 µg/ml.

Analysis of the results of the cytotoxic effect of the test substances shows that solvents of natural Zn and light isotopes of Zn are more toxic than the investigated Zn composites. Thus, $CC_{50}$ of citric acid is 1/160 or 0.014 mg/ml, and $CC_{50}$ of the composites in the solution of citric acid is 0.45 mg/ml for $Zn^{64}$ and 0.18 mg/ml for natural Zn, i.e. their toxicity is 3 to 10 times smaller. $CC_{50}$ of glutamic acid solution is 1:160 or 0.025 mg/ml, while that of the $Zn^{64}$ composite is ⅕-0.4 mg/ml and of natural Zn is 0.0046 mg/ml, i.e. light Zn-64 isotope reduces and natural Zn increases toxicity of the solvent; $CC_{50}$ of aspartic acid is 1/80 or 0.042 mg/ml, for light $Zn^{64}$ composites it is 1/10 or 0.75 mg/ml and for natural Zn it is 1/320-0.0046 mg/ml, that is, the same pattern is observed. $CC_{50}$ of glycine and methionine solutions is 1/160 or 0.018 mg/ml, and that of the composites of light $Zn^{64}$ isotope and natural zinc is 1/10 or 0.2 and 0.15 mg/ml, respectively, i.e. both light Zn-64 isotope and natural zinc reduced toxicity of the solvent by a factor of 10.

A different regularity was observed with respect to the TBPDA solvent: the light isotope increased toxicity of the solvent by a factor of 30, while natural Zn did not affect its toxicity for MDCK cells.

Almost the same pattern as in MDCK cells was observed in the culture of BNK and MDCK cells.

Antiviral Activity of Natural Zinc and Zinc Isotope

Assessment of Anti-Influenza Activity

To assess the antiviral activity of the drug solutions in vitro, a daily transplantable MDCK cell culture was used. Cells were cultured in plates containing RPMI-1640 medium supplemented with 10% fetal serum (Nunclon, Surface, Denmark) in a thermostat at 37° C. and $CO_2$ in air. The cells were treated with trypsin from bovine pancreas type XIII (Sigma Cat N 8642, USA) to increase their sensitivity to influenza virus infection. The mother solution of trypsin was prepared by adding 2 mg of trypsin to 1 ml of DMEM culture medium.

The cells were washed with the solution three times by adding 50 µl in each well; trypsin concentration was 2 µg/ml. The cell growth medium was then removed and replaced with the influenza virus at a dose of 100 $TCD_{50}$ (50% tissue cytopathic dose) after which the test drugs were added at different concentrations.

The cultures were incubated in a $CO_2$ incubator for 3 days with their daily monitoring using a microscope.

After 48-72 hours of incubation, the culture fluid was collected and the infectious titer of the influenza virus was determined by titration in the cell culture.

Influenza virus strain A/FM/1/47 (H1N1) was used in the experiment. The infectious titer in MDCK was 3.0-9.0 lg $ID_{50}$.

The inhibitory effect of the substances was evaluated by reducing the infectious titer of the virus under the action of the test substance in comparison with the control. A decrease by 1.5-2.0 lg $TCD_{50}$ indicates a pronounced antiviral activity of the compound under study, especially if the chemotherapeutical index is 8 or higher.

Figure 1B:
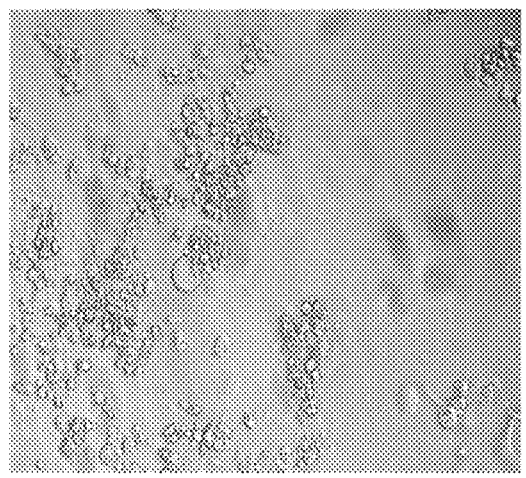

The results of assessment of the anti-influenza activity of solutions of natural Zn and its $Zn^{64}$ isotope ($EC_{50}$) in the culture of MDCK cells are presented in Table 3. See also FIG. 1A and FIG. 1B.

TABLE 3

Anti-influenza activity of solutions of natural Zn and its Zn-64 isotope (EC$_{50}$) and selectivity index

| | EC$_{50}$(µg/ml) | SI |
|---|---|---|
| 4 Zn-64 in citrate solution | 0.14 | 321 |
| 4 Natural Zn in citrate solution | 0.6 | 300 |
| 5 Zn-64 in EDDA | 1.875 | 40 |
| 5 Natural Zn in EDDA | inactive | inactive |
| 6 Zn-64 in sulfate solution | 1.875 | 40 |
| 6 Natural Zn in sulfate solution | inactive | inactive |
| 7 Zn-64 in aspartic acid solution | inactive | 0 |
| 7 Natural Zn in aspartic acid solution | inactive | inactive |
| 8 Zn-64 in glutamic acid solution | 0.09 | 3333 |
| 8 Natural Zn in glutamic acid solution | 0.09 | 56 |
| 9 Zn-64 in glycine-methionine solution | 0.625 | 320 |
| 9 Natural Zn in glycine-methionine solution | inactive | inactive |
| 10 Zn 64 in TBPDA solution | inactive | 0 |
| 10 Natural Zn in TBPDA solution | inactive | inactive |

It was determined that Zn-64 preparations and natural Zn in the citrate solution, Zn-64 in the glutamic acid and glycine-methionine solutions showed anti-influenza activity.

Assessment of Antiherpetic Activity

To study the antiherpetic activity of zinc solutions, its isotope and solvents, a transplantable VNK cell culture was used. Cells were cultured in plates containing RPMI-1640 medium supplemented with 10% fetal serum (Nunclon, Surface, Denmark) in a thermostat at 37° C. and CO$_2$ in air.

Herpes simplex virus type 2 strain BH was used. Its infectious titer is 6.0-0.9 lg ID$_{50}$.

Daily cultures of VNK cells were selected to study the antiviral activity of the drugs. The cell growth medium was removed and the test preparations were added to the cell monolayer at different concentrations. After 1 hour of contact, the cells were infected with herpes virus at a dose of 100 TCD$_{50}$. The cultures were incubated in a CO$_2$ incubator for 5 days with their daily monitoring using a microscope and recording the virus reproduction by the cytopathogenic effect of HSV on VNK cells compared to control cultures where the cell monolayer was not exposed to any viruses.

Figure 2:
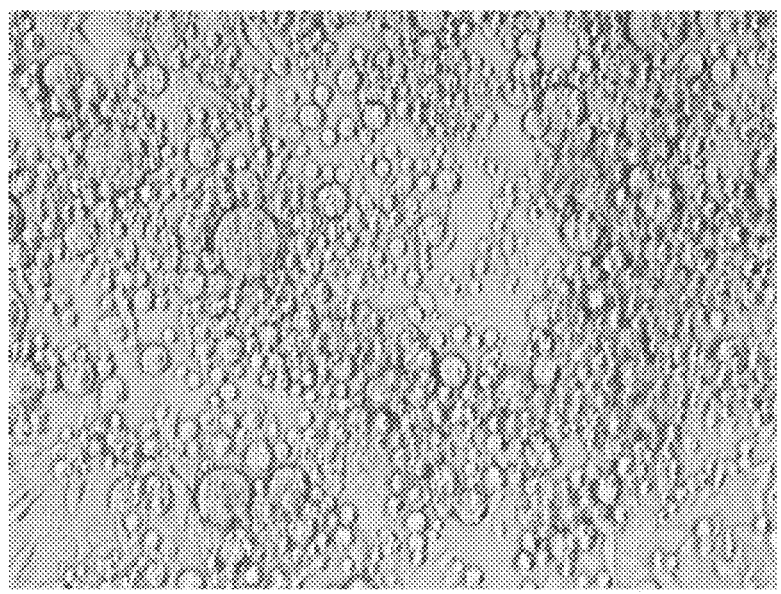
FIG. 2 shows Culture of VNK cells infected with herpes virus (symplasts). Magnification: 10×40

The cytopathic effect of HSV on cells morphologically manifests itself in the formation of symplasts or rounded cells in combination with proliferation and the appearance of giant multinuclear cells (FIG. 2).

After 3 days, the culture medium was collected from the plate wells and the infection titer was determined in each sample as each drug was added to each sample.

The results of assessment of the antiherpetic activity of solutions of natural Zn and its Zn 64 isotope (EC$_{50}$) in the culture of VNK cells are presented in Table 4.

TABLE 4

Antiherpetic activity of solutions of natural Zn and its Zn-64 isotope (EC$_{50}$) and selectivity index

| | EC$_{50}$(µ/ml) | SI |
|---|---|---|
| 4 Zn-64 in citrate solution | inactive | 0 |
| 4 Natural Zn in citrate solution | inactive | inactive |
| 5 Zn-64 in EDDA | inactive | 0 |
| 5 Natural Zn in EDDA | 1.5 | 400 |
| 6 Zn-64 in sulfate solution | inactive | 0 |
| 6 Natural Zn in sulfate solution | inactive | inactive |
| 7 Zn-64 in aspartic acid solution | inactive | 0 |
| 7 Natural Zn in aspartic acid solution | inactive | inactive |
| 8 Zn -64 in glutamic acid solution | 0.9 | 333 |
| 8 Natural Zn in glutamic acid solution | 0.09 | 56 |
| 9 Zn-64 in glycine-methionine solution | 0.31 | 645 |

TABLE 4-continued

Antiherpetic activity of solutions of natural Zn and its Zn-64 isotope (EC$_{50}$) and selectivity index

| | EC$_{50}$(µ/ml) | SI |
|---|---|---|
| 9 Natural Zn in glycine-methionine solution | 0.2 | 2 |
| 10 Zn 64 in TBPDA solution | inactive | 0 |
| 10 Natural Zn in TBPDA solution | inactive | inactive |

Natural Zn in EDDA and Zn-64 in the glutamic acid and glycine-methionine solutions showed antiherpetic activity.

Assessment of Anti-HCV Activity

Surrogate HCV, bovine viral diarrhea virus (BVDV), was used in this study as it is a test model for hepatitis C virus.

Figure 3A:
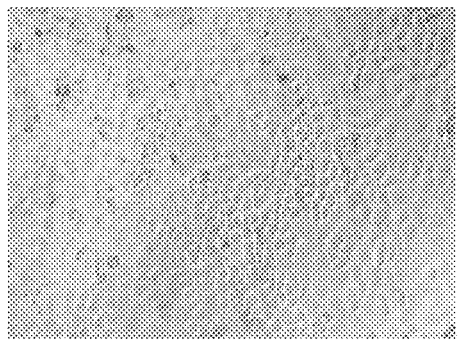
FIG. 3A and FIG. 3B show cytopathic effect of BVDV manifested in small cell degeneration of the monolayer of MDBK cells. Magnification: 10×40
Figure 3B:
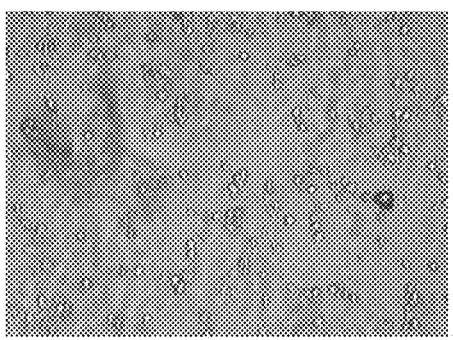

The antiviral activity of the drugs was studied in the culture of MDBK cells which was treated with different dilutions of the drugs and then infected with BVDV at a dose of 100 TCD$_{50}$. The cultures were incubated in a thermostat to a specific cytopathogenic action (FIG. 3A and FIG. 3B) in the virus control, after which the infectious virus titer was determined in the culture medium.

The results of assessment of the antiviral activity of solutions of natural Zn and its Zn 64 isotope (EC$_{50}$) in the culture of MDBK cells against the model of bovine viral diarrhea virus (BVDV) as surrogate HCV virus are presented in Table 5.

TABLE 5

Antiviral activity of solutions of natural Zn and its Zn-64 isotope (EC$_{50}$) against the BVDV model and their selectivity indices

| | EC$_{50}$(µ/ml) | SI |
|---|---|---|
| 4 Zn-64 in citrate solution | 0.11 | 45 |
| 4 Natural Zn in citrate solution | 0.11 | 1636 |
| 5 Zn-64 in EDDA | 0.375 | 24 |
| 5 Natural Zn in EDDA | 0.375 | 1600 |
| 6 Zn-64 in sulfate solution | 0.375 | 24 |
| 6 Natural Zn in sulfate solution | 0.35 | 800 |
| 7 Zn-64 in aspartic acid solution | 0.09 | 55 |
| 7 Natural Zn in aspartic acid solution | 0.09 | 56 |
| 8 Zn-64 in glutamic acid solution | 0.9 | 333 |
| 8 Natural Zn in glutamic acid solution | 0.09 | 56 |
| 9 Zn-64 in glycine-methionine solution | 0.31 | 645 |
| 9 Natural Zn in glycine-methionine solution | 0.23 | 8 |
| 10 Zn 64 in TBPDA solution | inactive | 0 |
| 10 Natural Zn in TBPDA solution | inactive | inactive |

Antiviral activity against surrogate hepatitis C virus (BVDV) was shown by natural Zn in citrate solution, in EDDA and in sulfate solution, and by Zn-64 in the solutions of glutamic acid and glycine-methionine.

Analysis of the antiviral activity of the solutions of natural zinc and light zinc isotope in different solvents showed that light isotopes of zinc in the solutions of glutamic acid and glycine-methionine were the most active with high selectivity index values for 3 viral infections. In the citric acid solution, their antiviral activity was noted against influenza virus and surrogate hepatitis C virus (BVDV), and natural Zn and its light isotope were both equally active here.

The salts of EDDA, sulfate and aspartic acid and of light zinc isotope and natural zinc had antiviral activity against the influenza virus and BVDV. The light Zn$^{64}$ isotope in the TBFDA solvent did not show any antiviral activity, and natural Zn was active only against influenza infection.

Assessment of Anti-EBV Activity

The results of assessment of the antiviral activity of solutions of natural Zn and its Zn$^{64}$ isotope in the culture of Raji cells against a model of Epstein-Barr virus infection are presented in Table 6.

TABLE 6

Antiviral activity of solutions of natural Zn and its Zn-64 isotope ($EC_{50}$) against the model of EBV and their selectivity indices

|  | $EC_{50}$(µ/ml) | SI |
|---|---|---|
| 4 Zn-64 in citrate solution | 0.9 | 43 |
| 4 Natural Zn in citrate solution | 1.8 | 255 |
| 5 Zn-64 in EDDA | 1.5 | 3 |
| 5 Natural Zn in EDDA | 20 | 45 |
| 6 Zn-64 in sulfate solution | inactive | 0 |
| 6 Natural Zn in sulfate solution | inactive | inactive |
| 7 Zn-64 in aspartic acid solution | 3 | 28 |
| 7 Natural Zn in aspartic acid solution | 0 | 0 |
| 8 Zn-64 in glutamic acid solution | 1 | 470 |
| 8 Natural Zn in glutamic acid solution | 3 | 166 |
| 9 Zn-64 in glycine-methionine solution | 1 | 200 |
| 9 Natural Zn in glycine-methionine solution | inactive | 0 |
| 10 Zn 64 in TBPDA solution | inactive | 0 |
| 10 Natural Zn in TBPDA solution | inactive | 0 |

The most active against the oncological Epstein-Barr virus were the drugs in solutions of glutamic acid and glycine-methionine with selectivity indices of 470 and 200.

Thus, antiviral screening of natural zinc and its light isotopes in various solvents showed that the most active were zinc compounds in glutamic acid and glycine-methionine, as well as in citric acid against BVDV.

Study of the Effect of the Compounds Under Study on Mitotic Regime of Cells

Considering high toxicity of the solvents for cell cultures, investigation into the effects of zinc-based drugs in different solutions on the mitotic regime of cells was carried out. The experiment was conducted on the culture of MDBK cells that were treated with various options of the drugs. After 24 hours of contact the cells were fixed and cytological preparations were made using a standard technique. The results obtained in this experiment are shown in Tables 7 and 8.

TABLE 7

Mitotic regime of MDBK cells treated with the drugs under study

| | Mitotic activity | | Abnormal mitoses | |
|---|---|---|---|---|
| Cell treatment | in % | MDBK | in % | MDBK |
| No 4 (2 ml medium + 4 µl drug) | 15.0 | 0.93 | 26.6 | 1.06 |
| No 4a (2 ml medium + 4 µl drug) | 14.0 | 0.87 | 27.1 | 1.08 |
| No 4k (2 ml medium + 4 µl drug) | 17.0 | 1.06 | 23.5 | 0.94 |
| No 5k (2 ml medium + 2 µl drug) | 19.0 | 1.18 | 26.3 | 1.05 |
| No 5 (2 ml medium + 2 µl drug) | 6.0 | 0.375 | 33.3 | 1.33 |
| No 6k (2 ml medium + 2 µl drug) | 15.0 | 0.93 | 26.6 | 1.06 |
| No 6 (2 ml medium + 2 µl drug) | 7.0 | 0.43 | 42.8 | 1.712 |
| No 7k (2 ml medium + 2 µl drug) | 13.0 | 0.81 | 23.1 | 0.92 |
| No 7 (2 ml medium + 2 µl drug) | 6.0 | 0.375 | 33.0 | 1.32 |
| No 8k (2 ml medium + 2 µl drug) | 17.0 | 1.06 | 23.5 | 0.94 |
| No 8 (2 ml medium + 2 µl drug) | 12.0 | 0.75 | 25.0 | 1.0 |
| No 8a (2 ml medium + 2 µl drug) | 15.0 | 0.93 | 20.0 | 0.8 |
| Tissue control | 16.0 | | 25.0 | |

Table 7 shows that only three drugs—No 25 (Zn 64 in EDDA solution), No 26 (Zn 64 in sulfate solution) and No 27 (Zn 64 in aspartic acid solution)—caused significant inhibition of the mitotic activity of cells and an increase in the number of mitotic abnormalities.

TABLE 8

Mitotic regime of MDBK cells treated with the drugs under study

| | Mitotic activity | | Abnormal mitoses | |
|---|---|---|---|---|
| Cell treatment, dilution | in % | MDBK | in % | MDBK |
| 9-1 2 µg/ml | 19.0 | 1.05 | 21.1 | 0.95 |
| 9-2 1.5 µg/ml | 15.0 | 0.83 | 26.6 | 1.19 |
| 9-3 (1:1000) | 7.0 | 0.38 | 42.5 | 1.91 |
| 10-1 3 µg/ml | 13.0 | 0.72 | 23.2 | 1.04 |
| 10-2 0.9 µg/ml | 10.0 | 0.55 | 30.0 | 1.35 |
| 10-3 (1:1000) | 16.0 | 0.88 | 25.0 | 1.12 |
| 10a (1:1000) | 14.0 | 0.77 | 22.2 | 1.0 |
| Tissue control | 18.0 | 1.0 | 22.2 | 1.0 |

Table 8 shows that three drugs—No 9-3 glycine-methionine solution and No 10-2 natural Zn in TBFDA solution—inhibited the mitotic activity of cells and increased the number of mitotic abnormalities.

Upon further analysis of the results of this study into the mitotic regime of MDBK cells under the influence of the drugs based on natural Zn and its light isotopes in nontoxic concentrations, it should be noted that $Zn^{64}$ in EDDA solution, $Zn^{64}$ in sulfate solution and $Zn^{64}$ in aspartic acid solution, natural Zn in TBFDA solution and glycine-methionine solvent significantly changed the mitotic regime of cells, i.e. their mitotic activity significantly decreased while the number of mitotic abnormalities increased. Therefore, light isotopes of zinc and natural zinc in glutamic acid, in glycine-methionine and in citric acid can be considered promising for further studies.

Thus, these studies into cytotoxicity and antiviral activity of the drugs show that $Zn^{64}$ citrate, $Zn^{64}$ in EDDA, $Zn^{64}$ aspartate, $Zn^{64}$ glutamate, $Zn^{64}$ glycine-methionine are the most promising as antiviral agents against EBV. Such selection is explained by the fact that solvents do not have antiviral activity and as part of zinc composites they do not influence the mitotic regime of cells and $Zn^{64}$ composites in glutamic acid and glycine-methionine effectively inhibit the reproduction of influenza and BVDV viruses.

Assessment of Antiviral Activity of Zinc Glutamate and its Isotope Composites in "Light Water"

It is known that hydrogen isotopes enter the human body mainly with drinking water and food. Getting into the body, water becomes a participant of a variety of biochemical processes, as a result of which its atoms can become structural units of various compounds synthesized by the body. A clear example of how the isotopic composition of water is reflected in the isotopic composition of protein synthesized by the body is given in Ehleringer J. et al. Proc. Nat. Acad. Sci USA, 2008, 105. P. 2788-2793. The authors show a direct relationship between the isotope compositions (H, O) of human hair (consisting predominantly of α-keratin protein) and drinking water.

In the cells, water is in a special structured state, intermediate between liquid water and ice. A layer of oriented water molecules surrounds all hydrophilic macromolecules in the protoplasm (including protein and nucleic acid molecules).

Strong antimitotic action of $D_2O$ (heavy water) was detected in the first experiments. Thus, in 1938, H. Barbour and E. Allen Barbour H., Allen E. Am. J. Cancer. 1938, 32. P. 440-446 described growth retardation and reverse development of transplanted lymphosarcoma and mammary carcinoma in mice receiving 40% $D_2O$ as drinking water. However, the total life span of tumor-affected mice under the influence of $D_2O$ was shorter than in the control group. Barbour H., Allen E. Am. J. Cancer. 1938, 32.P. 440-446. The same problem is considered in a number of other works. Finkel A., Czajke D. The effect of deuterium oxide on ascites tumor growth in mice/Ed. F. N. Furness, New York: New York Acad. Sci, 1960. P. 755-762. Hughes A. et al., *Birch. Bimorph. Acta.* 1958, 28. P. 58-61. Katz J. et al. *J. Nat. Cancer Inst.* 1957, 18. P. 641-659. Among recent studies, the research showing that the activity of pancreatic cancer development in the culture of AsPC-1, BxPC-3, PANC-1 cells decreases significantly with the successive use of 10-30% $D_20$ and gemcitabine (difluorodeoxycytigine) deserves special attention. At the same time, the authors showed that consumption of water containing 10-30% $D_2 0$ does not significantly affect the level of mononuclear cells in the peripheral blood, which indicates a limited adverse effect of $D_2 0$ on bone marrow cells. Hartmann J., et al. *Anticancer Res.,* 2005, 25. P. 3407-3411. In other works, on the contrary, positive (in addition to traditional forms of treatment) effect of light (deuterium-depleted) water in the treatment of oncological diseases is noted.

Therefore, the next stage of this work was the study of antiviral activity of natural Zn and its Zn-64 isotope composites dissolved in "light water", deuterium-depleted water. Substances Composition: 12-1—Zn-64 glutamate, conc. 2.0 mg/ml Zn in deuterium-depleted water Composition: 12-2—Zn-64 glutamate, conc. 1.5 mg/ml Zn in deuterium-depleted water Composition: 12-3 Zn glutamate, conc. 2.0 mg/ml Zn in deuterium-depleted water 4—distilled deuterium-depleted water ("light water")

The analysis of cytotoxicity and antiviral activity was carried out according to a procedure similar to that described above in the study of natural zinc and zinc isotope in normal distilled water.

The results are shown in Table 9.

TABLE 9

Effects of Zn-64 and natural zinc at various concentrations dissolved in "light water" on the models of DNA and RNA-containing viruses

| | Influenza virus | | | Herpes virus | | | Bovine viral diarrhea virus | | |
|---|---|---|---|---|---|---|---|---|---|
| | $CC_{50}$ (µg/ml) | $EC_{50}$ (µg/ml) | SI | $CC_{50}$ (µg/ml) | $EC_{50}$ (µg/ml) | SI | $CC_{50}$ (µg/ml) | $EC_{50}$ (µg/ml) | SI |
| Zn-64 in glutamic acid solution, 2 mg/ml | 2 | 0.25 | 8 | 2 | 0.0625 | 32 | 6.25 | 0.0125 | 500 |
| Zn-64 in glutamic acid solution, 1.5 mg/ml | 1.5 | 0.047 | 32 | 1.5 | 0.047 | 32 | 6.25 | 0.0375 | 125 |
| Natural Zn in glutamic acid solution, 2 mg/ml | 6.25 | 0.0625 | 100 | 6.25 | 0.0625 | 100 | 6.25 | 0.2 | 31 |

It was determined that dissolution of Zn-64 glutamate composites in "light water" resulted in a significant increase in the isotope toxicity for cell cultures as compared to natural zinc.

Table 9 shows results of studies of the antiviral activity of Zn-64 glutamate and Zn glutamate composites dissolved in "light water" against experimental models of influenza, herpes, and surrogate hepatitis C viruses. The results show that zinc preparations in "light water" effectively inhibited reproduction of all the viruses. However, since zinc preparations in "light water", especially light isotopes of zinc, were toxic, the selectivity index of these preparations was much lower than that of natural zinc.

Given the high toxicity of zinc composites for cell cultures, the study into the effect of zinc preparations in "light water" on the mitotic regime of cells was conducted. The culture of MDBK cells was selected for the study. The cells were treated with various drug options at concentrations nontoxic for cells. After 24 hours of contact, the cells were fixed and cytological preparations were prepared according to a conventional technique. The results obtained in this experiment are presented in Table 10.

TABLE 10

Mitotic regime of MDBK cells treated with the drugs under study

| | Mitotic activity | | Abnormal mitoses | |
|---|---|---|---|---|
| Cell treatment | in % | MDBK | in % | MDBK |
| 12-1 | 17.0 | 0.85 | 23.0 | 1.07 |
| 12-3 | 24.0 | 1.2 | 20.0 | 1.0 |
| Tissue control | 20.0 | 1.05 | 21.0 | 1.05 |

As can be seen from Table 10, the mitotic activity of preparations 12-1 and 12-3 was slightly different from that of the control group. The number of abnormal mitoses in these groups also slightly differed from that of intact cells.

Antiviral Activity of Zinc Preparations In Vivo

The anti-herpes activity of zinc preparations was studied in the model of herpes virus meningoencephalitis in BALB/c mice (18-20 g in weight) with their intracerebral administration at a dose of 0.03 ml. In all the experimental groups, the drug was administered intraperitoneally at a dose of 0.1 ml. The following zinc preparations were used in the experiments:

1. 4B—Zn-64 citrate in deuterium-depleted water—3 mg/ml
2. 4B-2—Zn citrate in deuterium-depleted water—3 mg/ml
3. 8B—Zn-64 glutamate in deuterium-depleted water—3 mg/ml
4. 8B-2—Zn glutamate in deuterium-depleted water—3 mg/ml
5. 9B—Zn-64 glycine-methionine in deuterium-depleted water—1 mg/ml
6. 9B-2—Zn glycine-methionine in deuterium-depleted water—1 mg/ml The drugs were injected 24 hours after infection with the herpes virus, a treatment regimen was observed.

The drug activity was evaluated by comparing the lethality in the experimental and control groups. The following factors were taken into account:
- percentage of animals that died
- multiplicity of protection (MP)—multiplicity of decrease in the number of dead mice in the experimental group compared to the control group
- efficacy index (EI) of the drugs was determined using the following formula:

$$EI = \frac{\text{multiplicity of protection} - 1}{\text{multiplicity of protection}} \times 100$$

With the treatment regimen observed, the following groups of animal were used in the experiment:

| 1 | mice injected with: | herpes virus + drug 4B |
|---|---|---|
| 2 | | herpes virus + drug 4B-2 |
| 3 | | herpes virus + drug 8B |
| 4 | | herpes virus + drug 8B-2 |
| 5 | | herpes virus + drug 9B |
| 6 | | herpes virus + drug 9B-2 |
| 7 | | Virolex + herpes virus |
| 8- | | normal saline solution + herpes virus |

The results are shown in Table 11.

TABLE 11

Protective effect of zinc preparations after their therapeutic administration to mice infected with the herpes virus

| Effect of preparations | Dose, μg/kg | Number of mice | Number of mice that died total | % | MP | EI | Inhibition of infectious titer in cerebral tissue in lg $TCD_{50}$ |
|---|---|---|---|---|---|---|---|
| 8 Zn-64 glutamate in deuterium-depleted water | 15.0 | 10 | 10 | 100.0 | — | 0 | — |
| 8 Zn glutamate in deuterium-depleted water | 15.0 | 10 | 8 | 80.0 | 1.25 | 20 | — |
| 4 Zn-64 citrate in deuterium-depleted water | 15.0 | 10 | 8 | 80.0 | 1.25 | 20 | — |
| 4 Zn citrate in deuterium-depleted water | 15.0 | 10 | 6 | 60.0 | 1.66 | 40 | — |
| 9 Zn-64 glycine-methionine in deuterium-depleted water | 5.0 | 10 | 2 | 20.0 | 5.0 | 80 | 1.5 |
| 9 Zn glycine-methionine in deuterium-depleted water | 5.0 | 10 | 2 | 20.0 | 5.0 | 80 | 2.0 |
| Virolex | 10 | 10 | 5 | 50.0 | 2.0 | 50.0 | 2.0 |
| Deuterium-depleted water | 100 μg | 10 | 5 | 50.0 | 2.0 | 50.0 | 2.0 |
| Herpes virus | — | 10 | 10 | 100 | — | — | — |

Based on the data given in Table 11, it can be concluded that preparations based on light isotope of zinc and natural zinc 9B, and especially 9B-2, have a pronounced therapeutic effect. However, with respect to the survival time, the composite of natural zinc and glycine methionine dissolved in deuterium-depleted water was more effective, since the lifespan here was longer than 30 days.

In Vivo Study into Anti-Influenza Activity of Zinc Preparations

The following zinc preparations were used in the experiments:
1. 4B—Zn-64 citrate in deuterium-depleted water—3 mg/ml
2. 4B-2—Zn citrate in deuterium-depleted water—3 mg/ml
3. 7B—Zn-64 asparaginate in deuterium-depleted water—3 mg/ml
4. 7B-2—Zn asparaginate in deuterium-depleted water—3 mg/ml
5. 8B—Zn-64 glutamate in deuterium-depleted water—3 mg/ml
6. 8B-2—Zn glutamate in deuterium-depleted water—3 mg/ml
7. 9B—Zn-64 glycine-methionine in deuterium-depleted water—1 mg/ml
8. 9B-2—Zn glycine-methionine in deuterium-depleted water—1 mg/ml To determine the anti-influenza activity of zinc preparations in vivo, a murine model of influenza pneumonia was used.

For this purpose, a BALB/c mouse lung-adapted A/FM/1/47 (H1N1) strain of influenza virus derived in 15 passages, with infectious titer of 5.0 lg $LD_{50}$, was used, 100% lethality of mice was observed for 5 days. The in vivo study into the anti-influenza activity of the drugs was conducted according to the treatment regimen. 24 hours after intranasal infection of mice with the influenza virus, they were injected intraperitoneally with 0.1 ml of solutions of zinc preparations. Control of the influenza virus and the reference drug Tamiflu was provided. The efficacy of the drugs was determined by the index of effectiveness of inhibition of animal lethality and the infectious titer of the influenza virus in the lung tissue of mice. The results of the study are presented in Table 12.

TABLE 12

Therapeutic effect of zinc preparations on the model of experimental influenza infection in vivo

| Effect of preparations | Dose, μg/kg | Number of mice | Number of mice that died total | % | MP | EI | Inhibition of infectious titer in cerebral tissue in lg TCD$_{50}$ |
|---|---|---|---|---|---|---|---|
| 4 Zn-64 citrate in deuterium-depleted water | 15.0 | 10 | 0 | 0 | — | 100 | <1.0 |
| 4 Zn citrate in deuterium-depleted water | 15.0 | 10 | 0 | 0 | — | 100 | <1.0 |
| 9 Zn-64 glycine-methionine in deuterium-depleted water | 5.0 | 10 | 10 | 100.0 | — | 0 | 5.5 |
| 9 Zn glycine-methionine in deuterium-depleted water | 5.0 | 10 | 10 | 100.0 | — | 0 | 5.5 |
| 8 Zn-64 glutamate in deuterium-depleted water | 15.0 | 10 | 2 | 20.0 | 5 | 80.0 | <1.0 |
| 8 Zn glutamate in deuterium-depleted water | 15.0 | 10 | 0 | 0 | — | 100 | <1.0 |
| 7 Zn-64 asparaginate in deuterium-depleted water | 15.0 | 10 | 10 | 100.0 | 0 | 0 | 6.0 |
| 7 Zn asparaginate in deuterium-depleted water | 15.0 | 10 | 4 | 40.0 | 2.5 | 60 | 3.0 |
| Tamiflu | 1000 | 10 | 3 | 30.0 | 3.3 | 70 | 2.5 |
| Influenza virus | — | 10 | 10 | 100 | | | 6.0 |

Analyzing the data presented in Table 12, it should be noted that according to the results of IE and infectious titer, preparations of natural zinc and light isotope of zinc 4B3, 4B3-2 and 8B3-2 completely protect mice from lethal influenza infection. Preparations 8B and 7B3-2 protect mice from lethal influenza infection with an efficacy index of 80.0 and 60.0. It should be noted that the survival time of animals infected with the influenza virus also increased significantly in groups of mice treated with 4B3, 4B3-2,8B3 and 8B3-2, compared with the control.

Since the antiviral effect of deuterium-depleted water on the herpes simplex virus model was noted, the effect of drugs administered at various doses was studied. Thus 50, 100 and 200 μl per mouse were administered to the infected animals.

Groups consisting of 8 mice each were included in the experiment. The mice were infected at a dose of 10 LD50 intracerebrally, 30 μl/mouse. The first administration of drugs was 24 hours later. After infection, there were 4 injections in total given every other day. Uninfected mice who received intracerebral injections of 30 μl of normal saline solution and the mice infected with HSV served as a control.

TABLE 13

In vivo effect of light water on a model of herpes virus with intracerebral infection

| | 14 day Number of survived mice/MP (%) |
|---|---|
| Control | |
| HSV control | |

TABLE 13-continued

In vivo effect of light water on a model of herpes virus with intracerebral infection

| | 14 day Number of survived mice/MP (%) |
|---|---|
| 50 μl/mouse | 3/38 |
| 100 μl/mouse | 4/50 |
| 200 μl/mouse | 6/75 |
| Aciclovir | 2/25 |

Thus, the protective effect of deuterium-depleted water on the model of herpes simplex virus is shown, which indicates the prospects of investigation into its properties as a component of medicine.

DISCUSSION

This work is devoted to the influence of zinc and its isotopes in compositions with different amino acids and solutions with their further dissolution in cell culture medium or in deuterium-depleted water.

There is ample evidence that zinc is important for the process of infection of cells with viruses. Nevertheless, the molecular basis of this interaction between viruses and cellular zinc is still largely unknown. There are two possible mechanisms of this phenomenon. First, zinc ions are a known cofactor in the reproduction of viruses on the part of viruses, and on the part of cellular proteins, zinc ions can alter the activity of various transcription cofactors and thus influence the expression of cellular and viral genes. The role of zinc as a protein cofactor is quite common among viruses. Zinc binding proteins are described for RNA and DNA viruses, such as retroviruses, adenoviruses, herpesviruses, polyomaviruses, and papilloma viruses. Goswami R. et al. *J. Virol.*, 1992, 66, p. 1746-1751. Turk B. et al. *J. virol.*, 1993, 67. p-3671-3673. Erk I. et al. *J. Virol.*, 2003, 77. P3595-3601. Fraefel et al. *J. Virol.*, 1994, 68. p. 31-54-3162. Grossman S., Laimins L. *Oncogene*, 1989, 4. p. 1089-1093. These viral proteins containing zinc are similar to zinc fingers of cellular proteins. Zinc finger is one of the main groups of proteins that bind DNA. They are regulators of transcription and contain a characteristic domain, which includes 2 cysteine and 2 histidine residues. These amino acids interact with a zinc ion, and a polypeptide chain located between them forms a finger-shaped loop. Zinc fingers $C_2H_2$ form an important family of DNA-binding protein domains that occur in transcription factors of eukaryotes $C_2H_2$.

Figure 4:
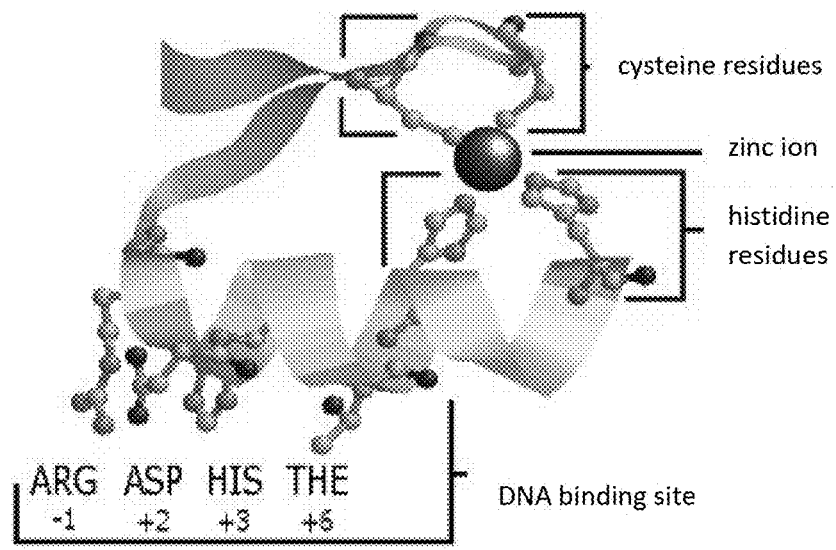
FIG. 4 shows a computer model of a zinc finger protein.

Both viral and cellular zinc fingers, which can participate in protein-protein and protein-nucleic interactions, are very conservative and critical for protein function. FIG. 4. The role of zinc fingers is most studied for structural proteins of HIV infection and papilloma virus. Mutations in zinc finger proteins, or extraction of zinc from these compounds, disrupt the function of releasing the virus from the cell, which can serve as one of the approaches in the treatment of viral infections. On the other hand, during replication of viruses in the cell, zinc imbalance is observed in the cell and a strategy of exogenous introduction of zinc into the cellular system can be used to prevent this imbalance in order to normalize the cell homeostasis.

Basically, the second concept, namely the use of composites of zinc and its isotopes with amino acids followed by their dissolution in culture medium (RPMI-1640) or in deuterium-depleted water, was used in the present studies.

The results obtained in the course of in vitro studies into the effect of composites zinc and its light isotope with different amino acids and solutions on the reproduction of influenza, herpes and surrogate model of HCV (BVDV) viruses indicate that solutions of zinc and its light isotopes effectively inhibit the reproduction of influenza, herpes and surrogate model of HCV (BVDV) viruses.

Zn-64 and Zn solutions in citric acid, Zn-64 and Zn in glutamic acid, and Zn-64 and Zn in glycine-methionine solution were most promising. It is confirmed by:
  inhibition of reproduction of influenza and herpes viruses, Epstein-Barr virus and surrogate hepatitis C virus (BVDV—bovine viral diarrhea virus);
  absence of influence on the mitotic regime of cells;
  inhibition of RNA and DNA synthesis by citrate and glutamate of the light isotope of zinc and Zn glycine-methionine.

Zinc glutamate and zinc light isotope glutamate composites in deuterium-depleted water effectively inhibited the reproduction of influenza, herpes and surrogate hepatitis C viruses, but the efficacy index of light isotope in all viral reproductive systems was several times lower than that of natural zinc since the $CC_{50}$ of light isotopes of Zn in deuterium-depleted water is much higher.

In non-toxic concentrations, neither natural Zn composites nor composites containing light isotope of zinc dissolved in deuterium-depleted water produced any effect on the mitotic regime of cells.

Zn-64 glutamate composites in deuterium-depleted water effectively inhibited RNA and DNA synthesis at a concentration of 50 µg/ml, 40 µg/ml and 10 µg/ml and 1.1 µg/ml respectively for preparation 12-1 (Zn-64 concentration is 1.5 mg/ml) and 12-2 (Zn-64 concentration is 1.5 mg/ml).

Through the example of experimental models of herpetic meningoencephalitis and influenza pneumonia it was shown that the effectiveness of the preparations depended on the interacting solvent in the composites of natural Zn and its isotope:

glycine-methionine composites of natural Zn and its light isotope had a healing effect on the model of herpetic meningoencephalitis, as evidenced by its selectivity index of inhibition of the infectious titer, the life span, more pronounced than that of the reference drug Virolex;

composites of natural Zn and its light isotope containing citric and glutamic acids produced pronounced therapeutic effect on the model of influenza pneumonia, showing a high index of efficacy, inhibition of infectious titer and the life span.

The antiviral effect of deuterium-depleted water on the model of the herpes simplex virus is shown.

Example 2: Assessment of Antiviral Activity of $Zn^{64}$-Based Preparations Against Epstein-Barr Virus (EBV)

This study was performed using lymphoblastoid Raji cells infected with EBV. Raji cells are EBV-transformed human B-lymphocyte cells that contain 63 copies of the viral genome per cell in the cellular DNA but never produce virions. The cell culture was grown in 24-well suspension culture plates in a growth medium consisting of 90% RPMI 1640, 10% fetal bovine serum and antibiotics incubated at 37° C. and 5% $CO_2$. This cell line presents a good model for the study of antiviral activities of substances against Epstein-Barr virus.

When studying in vitro antiviral activities of a new substance it is first necessary to determine the level of its cytotoxicity, since drugs that show high toxicity to cell cultures are not promising for further studies. The value to be determined is defined as the cytotoxicity concentration of the substance that will reduce viability of the cell population by 50% ($CC_{50}$).

Cytotoxicity of the preparations under study was assessed using the MTT (3-(4,5-dimethylthiazol-2-yl)-2-5-diphenyltetrozolium bromide) assay, one of the commonly used colorimetric assay (Sigma USA). This assay determined cell viability through determination of mitochondrial function of cells by measuring activity of mitochondrial enzymes such as succinate dehydrogenase. In this assay, MTT is reduced to a purple formazan by NADH, which can be quantified spectrophotometrically. Transformation of MTT into formazan significantly decreases in a dose-dependent manner when cells die under the action of a virus or substance toxic to cells. The purple color was measured at an excitation wavelength of 540 nm using a Thermo Scientific (USA) reader.

The table below shows the results of detection of the viability of cells treated with different doses of the preparations under study.

Dose-dependent effects of the preparations under study on viability of Raj i cells

4

| µg/ml | Zinc citrate | $Zn^{64}$ citrate | $Zn^{64}$ citrate 48 hours |
|---|---|---|---|
| 7.03125 | 1.2323 | 1.0307 | 1.1062 |
| 14.0625 | 1.5352 | 0.4679 | 0.2148 |
| 28.125 | 1.4067 | 0.6074 | 0.1458 |
| 56.25 | 1.3878 | 0.0380 | 0.1563 |
| 112.5 | 1.4300 | 0.0517 | 0.1999 |
| 225 | 1.3066 | 0.0521 | 0.1019 |
| 450 | 0.7786 | 0.0660 | 0.1536 |
| $CC_{50}$ | 459.9874 | 39.02483 | 69.53351651 |

5

| µg/ml | Zn-EDDA | $Zn^{64}$-EDDA | $Zn^{64}$ EDDA 48 hours |
|---|---|---|---|
| 23.4375 | 1.4620 | 0.6468 | 0.1895 |
| 46.875 | 1.2557 | 0.0549 | 0.2192 |
| 93.75 | 1.5540 | 0.0481 | 0.1840 |
| 187.5 | 1.5045 | 0.0371 | 0.1568 |
| 375 | 1.4068 | 0.0476 | 0.2885 |
| 750 | 1.0975 | 0.0342 | 0.1384 |
| 1500 | 0.0701 | 0.0630 | 0.1543 |
| $CC_{50}$ | 904.3671 | 4.404449 | 0.143566517 |

6

| µg/ml | Zinc sulfate | $Zn^{64}$ sulfate | $Zn^{64}$ sulfate 48 hours |
|---|---|---|---|
| 23.4375 | 1.4022 | 0.0877 | 0.2162 |
| 46.875 | 1.5398 | 0.0813 | 0.1547 |
| 93.75 | 1.5323 | 0.0457 | 0.1905 |
| 187.5 | 1.5345 | 0.0197 | 0.2365 |
| 375 | 1.4047 | 0.0179 | 0.2314 |
| 750 | 1.1833 | 0.3918 | 0.2693 |
| 1500 | 0.2703 | 0.2740 | 0.7780 |
| $CC_{50}$ | 1064.422 | 0.123292 | 0.252254105 |

7

| µg/ml | Zinc aspartate | $Zn^{64}$ aspartate | $Zn^{64}$ aspartate 48 hours |
|---|---|---|---|
| 11.71875 | 1.2644 | 1.1739 | 0.7740 |
| 23.4375 | 1.1099 | 0.3162 | 0.1858 |
| 46.875 | 0.8077 | 0.0729 | 0.1560 |
| 93.75 | 0.7880 | 0.0749 | 0.1633 |
| 187.5 | 0.8642 | 0.0921 | 0.2566 |
| 375 | 0.7959 | 0.0463 | 0.2359 |
| 750 | 0.1895 | 0.0174 | 0.0796 |
| $CC_{50}$ | 305.4865 | 83.75588 | 20.05233039 |

8

| µg/ml | Zinc glutamate | $Zn^{64}$ glutamate |
|---|---|---|
| 23.4375 | 1.0313 | 0.8444 |
| 46.875 | 0.6602 | 0.7586 |
| 93.75 | 0.7557 | 0.8815 |
| 187.5 | 0.7661 | 1.3358 |
| 375 | 0.7052 | 1.1293 |
| 750 | 0.5863 | 1.0171 |
| 1500 | 0.2921 | 0.8644 |
| $CC_{50}$ | 499.8229 | 470.4757 |

9

| µg/ml | glycine-methionine | Zinc in glycine-methionine | $Zn^{64}$ in glycine-methionine |
|---|---|---|---|
| 200 | 0.07165 | 0.1974 | 1.37105 |
| 40 | 0.70485 | 1.1895 | 1.2575 |
| 20 | 0.1716 | 0.3207 | 1.26645 |
| 2 | 1.2439 | 1.31175 | 1.26635 |
| $CC_{50}$ | 1.322375 | 78.59242 | >200 |

10-11

| µg/ml | Zn TBPDA | $Zn$ TBPDA | µg/ml | $Zn^{64}$ TBPDA | $Zn^{64}$ TBPDA 14 days |
|---|---|---|---|---|---|
| 90 | 0.152 | 0.0709 | 300 | 0.5629 | 0.9488 |
| 18 | 0.1791 | 0.1924 | 60 | 0.829 | 0.967 |
| 9 | 1.23465 | 1.33445 | 30 | 0.8946 | 1.25675 |
| 0.9 | 1.28705 | 1.3762 | 3 | 1.4913 | 1.2759 |
| $CC_{50}$ | 33.46057 | 34.51308 | | 182.1071 | 367.4386 |

As can be seen from the table 14, glutamate-based and glycine-methionine-based preparations are the least toxic. $CC_{50}$ values of the test substances are 470 and >200.

TABLE 15

Analysis of antiviral activity of test substances

4

| | µg/ml | | |
|---|---|---|---|
| Solvent | 1.8 | 0 | 100 |
| $Zn^{64}$ citrate | 1.8 | 11512.5 | 8.920404 |
| fresh | 1.8 | 5646.539 | −46.5778 |
| fresh | 0.9 | — | 100 |

5

| | µg/ml | | |
|---|---|---|---|
| Solvent | 6 | 8880.355 | −15.9825 |
| $Zn^{64}$ in EDDA | 6 | 8880.355 | −16 |
| fresh | 6 | 3209.613 | −69.6337 |
| fresh | 3 | <100 | 100 |

6
does not work

7

| | µg/ml | | |
|---|---|---|---|
| Solvent | 3 | 9908.332 | −6.25672 |
| $Zn^{64}$ aspartate | 3 | 3400 | −67.8324 |
| preparation 7 fresh | 3 | 9206.738 | −12.8945 |
| preparation 7 fresh | 1.5 | 11637.32 | 10.10129 |

8

| | µg/ml | | |
|---|---|---|---|
| Solvent | 3 | 3419.645 | −67.6466 |
| $Zn^{64}$ glutamate | 3 | 4513.094 | −57.3014 |
| fresh | 3 | — | 100 |
| fresh | 1.5 | 11307.32 | 6.979146 |

| | Dose of the preparation | |
|---|---|---|
| | 1 µg/ml | 10 µg/ml |
| Zinc in glycine-methionine | % of inhibition | |
| Glycine-methionine (solvent) | 0 | 20 |
| Zinc in glycine-methionine | 0 | 25 |
| $Zn^{64}$ in glycine-methionine | 100 | 91 |
| Zn in TBPDA complex: | | |
| TBPDA (solvent) | 73 | 71 |
| Zinc in TBPDA | 80 | 15 |
| $Ze^{64}$ in TBPDA | 98 | 78 |
| $Ze^{64}$ in TBPDA 14 days | 74 | 80 |

Thus, analysis of the results of assessment of cytotoxicity and antiviral activity of the preparations under study shows that $Zn^{64}$ citrate, $Zn^{64}$ EDDA, $Zn^{64}$ aspartate, $Zn^{64}$ glutamate and $Zn^{64}$ in glycine-methionine are the most promising substances for anti-EBV infection.

Example 3. Use of KLS-1 in the Treatment of Covid-19

The mechanism of KLS-1 ($^{64}Zn_e$ aspartate) action is based on the prevention of virus penetration through the receptor—zinc metalloenzyme ACE 2 to a new cells and inhibition of coronavirus reproduction in already affected cells. Homeostasis restoration effect is achieved by the correction of cellular proteins production in ribosomes.

The synthesis of KLS and phase 1-2 study on Covid-19 patients is ready to start. Quantities of KLS-1 enough for the treatment of big number of patents can be produced in a short time.

KLS-1 represents a new platform critical for defeating not only Covid-19 coronavirus but also its possible any future mutant derivatives.

The results obtained in the course of in vitro studies into the effect of composites zinc and its light isotope with different amino acids and solutions on the reproduction of influenza, herpes and surrogate model of HCV (BVDV) viruses indicate that solutions of zinc and its light isotopes effectively inhibit the reproduction of influenza, herpes and surrogate model of HCV (BVDV) viruses.

Zn-64 and Zn-natural solutions in citric acid, Zn-64 and Zn in glutamic acid, and Zn-64 and Zn in glycine-methionine solution were most promising. It is confirmed by:

Inhibition of reproduction of influenza and herpes viruses, Epstein-Barr virus, and surrogate hepatitis C virus (BVDV—bovine viral diarrhea virus).

Absence of influence on the mitotic regime of cells.

Inhibition of RNA and DNA synthesis by citrate and glutamate of the stable light isotope of zinc-64 and Zn-64 glycine-methionine.

Zinc glutamate and zinc-64 light isotope glutamate composites in deuterium-depleted water effectively inhibited the reproduction of influenza, herpes and surrogate hepatitis C viruses, but the efficacy index of light isotope in all viral reproductive systems was several times lower than that of natural zinc since the $CC_{50}$ of light isotopes of Zn in deuterium-depleted water is much higher.

The results of assessment of cytotoxicity and antiviral activity of the preparations under study shows that $Zn^{64}$ citrate, $Zn^{64}$ EDDA, $Zn^{64}$ aspartate, $Zn^{64}$ glutamate and $Zn^{64}$ n glycine-methionine are the most promising substances for anti-EBV infection.

Anti-Inflammatory Effect and Homeostatic Effect

Another precious feature of Zn-64 based KLS-1 are strong general anti-inflammatory effect and homeostatic effect. The data was obtained during preclinical studies of the KLS-1 efficacy in treatment of obesity (which also an important complicating factor for Covid-19), Diabetes 1&2, Parkinson's disease, and Alzheimer's disease.

Both anti-inflammatory and homeostatic action of KLS-1 are extremely important for the treatment of Covid-19 patients to prevent or reduce intensity of cytokine storm and reduce inflammation in homeostatic manner without damaging efficiency of the immune system.

Adipose tissue is not only an energy depot of the body, but also an organ that is actively involved in the regulation of metabolism through a complex of endocrine, paracrine and autocrine signals modulating responses of many tissues and organs, including the hypothalamus, hypophysis, pancreas, liver, skeletal muscles, kidneys, endothelium, the immune system, etc. Thus, adipose tissue secretes more than 50 protein factors, hormones, and growth factors, including cytokines. There are pro-inflammatory cytokines, such as IL-1, IL-6, IL-8, IL-12, TNF-α, IFN-γ and anti-inflammatory cytokines, such as IL-4, IL-10, IL-13, TGF.

One consequence of excessive production of reactive oxygen species in adipocytes is the initiation of signaling cascades, leading to an increase in the production of pro-inflammatory cytokines by macrophages which infiltrate in adipose tissue increasing in its mass. The result of such disorders is the formation of systemic chronic inflammation in the body of a person that develops obesity. According to the actively discussed modern concept, it is subclinical chronic inflammation in adipose tissue that is thought to be one of the key links in the pathogenesis of obesity and obesity-related diseases. Chronic inflammation of adipose tissue is characterized by cellular infiltration, fibrosis, microcirculation changes, impaired adipokine secretion and adipose tissue metabolism disorders, as well as increased blood levels of such non-specific inflammatory markers as C-reactive protein, fibrinogen, and leukocytes.

An increase in the levels of pro-inflammatory cytokines not only in adipose tissue, but also in blood serum occurs a result of the inflammatory process in adipose tissue.

Cytokines, as endogenous biologically active mediators that regulate intercellular and intersystem interactions, influence the survival of cells by regulating their growth, differentiation, functional activity, and apoptosis. They ensure coordination of actions of the immune, endocrine and nervous systems under physiological conditions and in response to pathological effects. It was previously believed that cytokines were produced by lymphocytes, monocytes and tissue macrophages. However, the results from recent research show that, in obesity, as in any inflammatory process, infiltration of neutrophils, T-lymphocytes, and then resident macrophages into adipose tissue occurs at an early stage, which determines the initial mechanisms of inflammation. It has been shown that macrophages contribute to hypertrophy of adipocytes, which is accompanied by an increase in their functional activity and increased synthesis of cytokines and leads to further intensification of the inflammatory response. Hypertrophied adipocytes intensely secrete chemokines and their receptors, which stimulate the influx of new neutrophils, macrophages and lymphocytes, thus contributing to a further increase in adipocyte hypertrophy, preservation and intensification of the inflammatory response. Adipocytes increase the secretion of cytokines by macrophages, which in turn act on adipocytes, causing hypertrophy and activation of adipose tissue cells. It has been found that hypertrophied adipocytes, like lymphocytes and macrophages, produce cytokines and activate the complement, triggering a chain of inflammatory processes. As a result, the inflammation becomes steady and systemic. In addition, lipid peroxidation products, such as trans-4-oxy-2-nonenal and malonic dialdehyde, are chemo-attractants for monocytes and macrophages. Strengthening of the processes of lipid peroxidation in accumulated adipose tissue contributes to the attraction and infiltration of macrophages into adipose tissue in obesity, thus actively contributing to the launch of inflammation reactions.

Consequently, an increasing adipose tissue mass is a constant source of pro-inflammatory cytokines synthesized both by adipocytes and macrophages incorporated into adipose tissue, which leads to the formation of a chronic inflammatory process and maintenance of inflammation in the body. Its low intensity does not give direct clinical symptoms, but at the same time, this process is systemic in nature, which means that it affects a wide range of organs and tissues causing changes in their metabolism and impairing their function and immune system reactions.

Given the above, the next phase is to find out whether the administration of Zn-64 stable isotope in aspartate form influences the cytokine profile in obese animals. For this purpose, concentrations of the main pro-inflammatory (IL-1, IL-6, IL-12, IFN-7) and anti-inflammatory (IL-4, IL-10, TGF) cytokines in adipose tissue and serum of experimental animals were determined, which allowed us to make a conclusion about the intensity of the inflammatory process in adipose tissue and assess whether such inflammatory process is systemic.

According to the obtained results, the development of obesity was accompanied by an increase in the levels of all analyzed pro-inflammatory cytokines (Table 16) in the adipose tissue of animals fed a high-fat diet, which indicates activation of the inflammatory process In turn, a prolonged inflammatory process may lead to the development of various complications. Intensification inflammatory processes and increased accumulation of inflammatory intermediates may cause tissue damage and organs dysfunction.

increased production of C-reactive protein (CRP), another factor associated with obesity.

One of the controlling mechanisms for the levels and, accordingly, the biological effects of pro-inflammatory cytokines is implemented by a group of anti-inflammatory cytokines. These cytokines can inhibit the synthesis of pro-inflammatory cytokines by affecting transcription of specific genes, induce the synthesis of receptor antagonists of interleukins RAIL, enhance the production of soluble receptors and reduce the density of pro-inflammatory receptors on cells. Therefore, to clarify possible mechanisms of the effects of Zn-64 stable isotope in aspartate form on the

TABLE 16

Cytokine profile in the adipose tissue of animals from experimental groups (M ± m, n = 10)

| | Levels, RU/mg protein | | | | | | |
|---|---|---|---|---|---|---|---|
| | Pro-inflammatory cytokines | | | | Anti-inflammatory cytokines | | |
| Groups | IL-1 | IL-6 | IL-12 | IFN-γ | IL-4 | IL-10 | TGF |
| C | 5.6 ± 1.3 | 5.9 ± 0.7 | 1.2 ± 0.03 | 4.7 ± 1.2 | 4.8 ± 0.5 | 4.7 ± 0.7 | 4.5 ± 0.9 |
| C + zinc64 | 4.9 ± 1.7 | 5.4 ± 0.3 | 1.0 ± 0.03 | 5.0 ± 0.8 | 5.0 ± 0.4 | 4.9 ± 0.2 | 5.1 ± 0.6 |
| DIO | 9.8 ± 2.8 * | 8.9 ± 0.7 * | 2.87 ± 0.08 * | 7.6 ± 1.2 * | 3.9 ± 0.2* | 3.1 ± 0.6* | 3.1 ± 0.1* |
| DIO + Zinc64 | 5.8 ± 1.8 # | 6.1 ± 0.7 # | 1.99 ± 0.01 # | 4.9 ± 0.8 # | 5.1 ± 1.2 # | 5.8 ± 0.8 # | 5.2 ± 0.9 # |

*the difference is significant versus the control group of animals;
—the difference is significant versus the group of animal models of obesity
Note:
C—control;
C + zinc—control on the background of administration of Zn-64 stable isotope in aspartate form;
DIO—diet induced obesity;
DIO + zinc64—diet induced obesity on the background of administration of Zn-64 stable isotope in aspartate form.

It has been proven that high levels of pro-inflammatory cytokines, including those mentioned above, can provoke apoptosis of β-cells. High concentrations of IL-12, the expression of which is activated by IFN-γ, lead to infiltration of CD8+ lymphocytes in the pancreas and the development of acute pancreatitis. IL-1β, via binding to specific receptors on the surface of these cells, causes activation of NF-κB-mediated apoptosis, which leads to DNA fragmentation and loss of functional activity of cells. In addition, IL-1β may also be regarded as one of the factors contributing to the development of resistance of peripheral tissues to insulin. IL-1β has been shown to activate IκB kinase-β which influences insulin signaling by phosphorylating a serine residue in the insulin receptor substrate (IRS)-1. In addition, IL-1β can increase resistance to the action of insulin indirectly, by activating lipogenesis in the liver and contributing to an increase in the levels of triglycerides and free fatty acids in adipocytes.

It has been shown that IL-6 is accumulated in direct proportion to an increase in the adipose tissue mass in peripheral blood. Adipocytes are the second largest source of IL-6 after the immune system: 35% of circulating IL-6 is synthesized by adipose cells. Its concentration in the blood is directly proportional to the body mass index and is increased in obesity. At the same time, a decrease in body weight is accompanied by a decrease in the blood levels of IL-6. When in excess, IL-6 exacerbates insulin resistance by suppressing synthesis of one of the insulin receptor subunits. By activating lipolysis in visceral adipose tissue, IL-6 contributes to the progressive development of fatty hepatosis and systemic atherosclerosis. In addition, IL-6 induces profile of pro-inflammatory cytokines, the levels of IL-4, IL-10, and TGF were determined.

Detected changes in the levels of pro-inflammatory cytokines occurred against the background of a slight decrease in the levels of anti-inflammatory cytokines in obese animals. At the same time, in animals treated with Zn-64 stable isotope in aspartate form, the levels of anti-inflammatory cytokines were not only higher than in the untreated animal models of obesity, but also higher than in the animals from the control group.

It should be emphasized that the absence of changes in the animals from the control group treated with the test substance suggests that a long-time use of Zn-64 stable isotope in aspartate form is safe and it is able to show a therapeutic effect only with the development of pathological conditions.

As mentioned above, the pathogenesis of obesity is accompanied by a systemic chronic inflammatory process, the intensity of which can be assessed by the serum levels of pro- and anti-inflammatory cytokines.

Analysis of the cytokine profile in the serum of animals having obesity (Table 17) showed an increase in the levels of pro-inflammatory cytokines, more pronounced compared with the data obtained from adipose tissue. No statistically significant changes in the levels of anti-inflammatory cytokine IL-4 were found. A slight increase in the serum levels of IL-10 in obese animals can be regarded as a certain compensatory response of the body to a metabolic disorder.

In animals treated with Zn-64 based KLS-1 there was a decrease in the levels of pro-inflammatory cytokines against the background of an increase in the levels of anti-inflammatory cytokines, which were even higher than in the animals from the control group.

TABLE 17

Cytokine profile in the serum of animals from experimental groups
(M ± m, n = 10)

| | Levels, RU/mg protein | | | | | | |
|---|---|---|---|---|---|---|---|
| | Pro-inflammatory cytokines | | | | Pro-inflammatory cytokines | | |
| Groups | IL-1 | IL-6 | IL-12 | IFN-γ | IL-4 | IL-10 | TGF |
| C | 3.4 ± 0.3 | 4.5 ± 0.3 | 0.5 ± 0.05 | 3.6 ± 0.8 | 5.1 ± 0.2 | 3.9 ± 0.4 | 3.8 ± 0.8 |
| C + Zinc64 | 3.5 ± 0.7 | 4.3 ± 0.2 | 0.3 ± 0.04 | 4.6 ± 0.6 | 4.6 ± 0.8 | 4.1 ± 0.5 | 4.1 ± 0.4 |
| DIO | 11.1 ± 2.0 * | 7.9 ± 0.5 * | .7 ± 0.07 * | 6.5 ± 0.8* | 4.4 ± 0.9 | 4.1 ± 1.5 | 3.5 ± 1.3 |
| DIO + Zinc64 | 4.2 ± 0.4 # | 5.1 ± 0.4 # | 2.4 ± 0.06 *, # | 4.1 ± 1.2 | 5.6 ± 1.6 | 6.8 ± 1.1*, # | 5.7 ± 0.3 *, # |

*the difference is significant versus the control group of animals;
—the difference is significant versus the group of animal models of obesity
Note:
C—control;
C + zinc—control on the background of administration of Zn-64 stable isotope in aspartate form;
DIO—diet induced obesity;
DIO + zinc—diet induced obesity on the background of administration of Zn-64 stable isotope in aspartate form.

One of the basic mechanisms of the effect of zinc on the cytokine profile may be its inhibition of transcription factors sensitive to oxidative stress. Zinc-64 may also partially block genes encoding pro-inflammatory cytokines, such as IL-6 and IL-8.

Anti-inflammatory effect of Zn-64 aspartate (KLS-1) does not depend on the pathogenesis of inflammation. It is a result of the restoration of healthy homeostasis.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the appended claims. Thus, while only certain features of the invention have been illustrated and described, many modifications and changes will occur to those skilled in the art. It is therefore to be understood that the appended claims are intended to cover all such modifications and changes as fall within the true spirit of the invention.

What is claimed is:

1. A method of treating a disease or condition caused by a herpes viral infection comprising administering by injection or orally to a subject in need thereof a therapeutically effective amount of a composition comprising $^{64}$zinc-enriched ($^{64}Zn_e$) Zn, wherein the $^{64}Zn_e$ is at least 80% $^{64}Zn_e$ and is in a glycine-methionine solution or in a glutamic acid solution.

2. The method of claim 1, wherein said $64Zn_e$ is at least 95% $^{64}Zn_e$.

3. The method of claim 1, wherein said $64Zn_e$ is at least 99% $^{64}Zn_e$.

4. The method of claim 1, further comprising a diluent comprising deuterium-depleted water.

* * * * *